United States Patent
Ohashi

(10) Patent No.: US 9,201,223 B2
(45) Date of Patent: Dec. 1, 2015

(54) IMAGING LENS, CAMERA AND HAND-HELD DATA TERMINAL DEVICE

(71) Applicant: Kazuyasu Ohashi, Funabashi (JP)

(72) Inventor: Kazuyasu Ohashi, Funabashi (JP)

(73) Assignee: RICOH COMPANY, LTD., Tokyo (JP)

( * ) Notice: Subject to any disclaimer, the term of this patent is extended or adjusted under 35 U.S.C. 154(b) by 316 days.

(21) Appl. No.: 13/828,197

(22) Filed: Mar. 14, 2013

(65) Prior Publication Data

US 2013/0265649 A1    Oct. 10, 2013

(30) Foreign Application Priority Data

Mar. 16, 2012  (JP) .................. 2012-061273

(51) Int. Cl.
*G02B 15/14* (2006.01)
*G02B 13/02* (2006.01)

(52) U.S. Cl.
CPC ............. *G02B 15/14* (2013.01); *G02B 13/02* (2013.01)

(58) Field of Classification Search
CPC .................. G02B 15/14; G02B 13/02
See application file for complete search history.

(56) References Cited

U.S. PATENT DOCUMENTS

| | | | |
|---|---|---|---|
| 4,986,643 A | 1/1991 | Moriyama | |
| 5,153,779 A | 10/1992 | Ohashi | |
| 5,381,270 A * | 1/1995 | Cho | 359/692 |
| 5,675,440 A | 10/1997 | Kanamori | |
| 2002/0101665 A1 | 8/2002 | Ohashi et al. | |
| 2005/0094002 A1 | 5/2005 | Ohashi | |
| 2006/0007561 A1 | 1/2006 | Suzuki | |
| 2008/0204894 A1 | 8/2008 | Ohashi | |
| 2010/0027136 A1 | 2/2010 | Ohashi et al. | |
| 2011/0043927 A1 | 2/2011 | Sudoh | |
| 2011/0310496 A1 | 12/2011 | Kubota et al. | |
| 2011/0317285 A1 | 12/2011 | Ohashi et al. | |
| 2012/0212838 A1 | 8/2012 | Ohashi | |

FOREIGN PATENT DOCUMENTS

| | | |
|---|---|---|
| JP | 63-24213 | 2/1988 |
| JP | 1-316714 | 12/1989 |
| JP | 3-138612 | 6/1991 |
| JP | 7-281089 | 10/1995 |
| JP | 8-313803 | 11/1996 |
| JP | 2679130 | 8/1997 |
| JP | 9-236746 | 9/1997 |
| JP | 2000-321490 | 11/2000 |
| JP | 2005-352060 | 12/2005 |
| JP | 2007-219529 | 8/2007 |
| JP | 2009-216858 | 9/2009 |
| JP | 2010-72639 | 4/2010 |

OTHER PUBLICATIONS

U.S. Appl. No. 13/803,262, filed Mar. 14, 2013, Kubota, et al.
U.S. Appl. No. 13/803,112, filed Mar. 14, 2013, Ohashi, et al.

* cited by examiner

*Primary Examiner* — Joseph P Martinez
(74) *Attorney, Agent, or Firm* — Oblon, McClelland, Maier & Neustadt, L.L.P.

(57) ABSTRACT

An imaging lens includes a first lens group having a positive refractive power on an object side and including at least three positive lenses and at least two negative lenses, and a second lens group having a negative refractive power on an image side and having a negative lens, the first and second lens groups arranged in this order from the object side with a widest air space in-between, wherein in focusing an object from infinity to a close range, only the first lens group is moved to the object side and the second lens group is fixed relative to an image plane.

12 Claims, 11 Drawing Sheets

FIG. 7
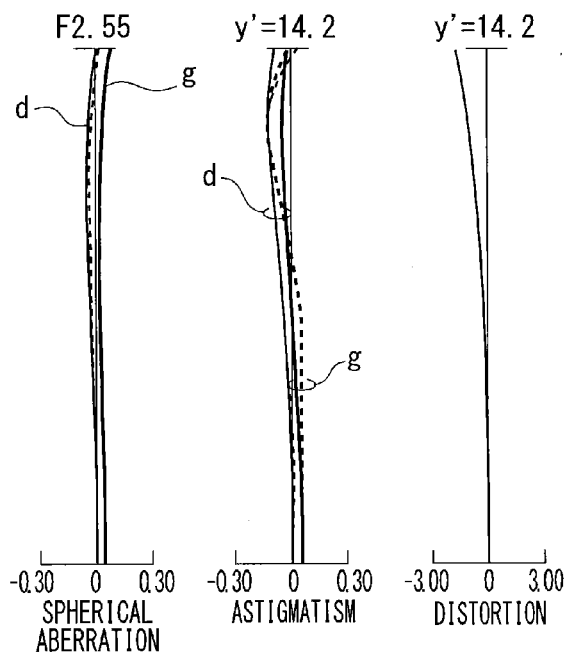
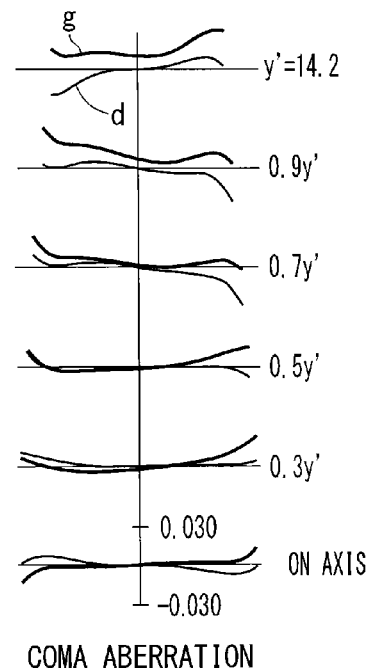
FIG. 8
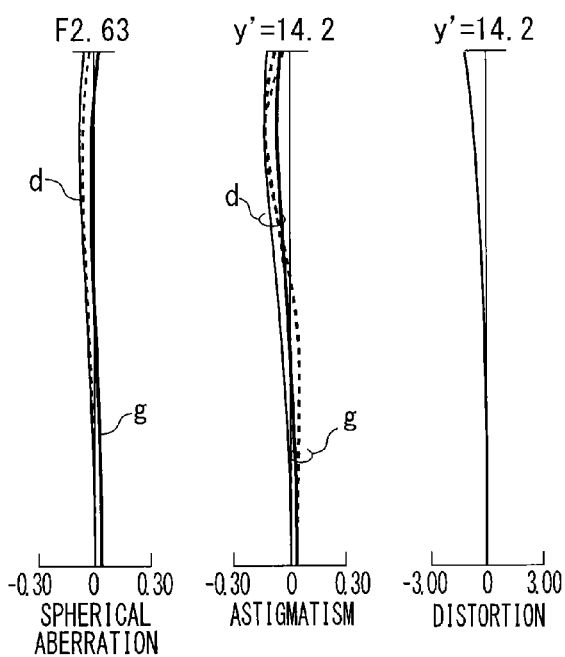
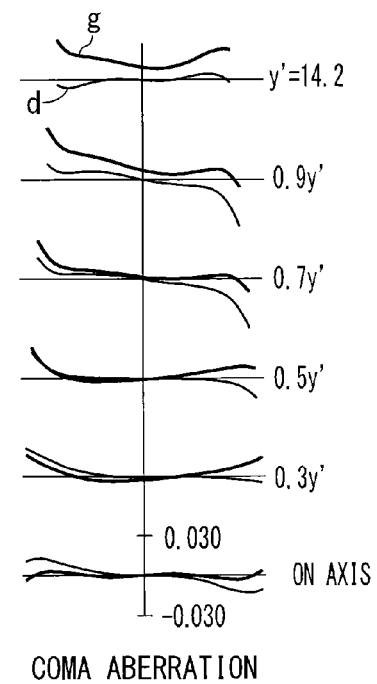

FIG. 9
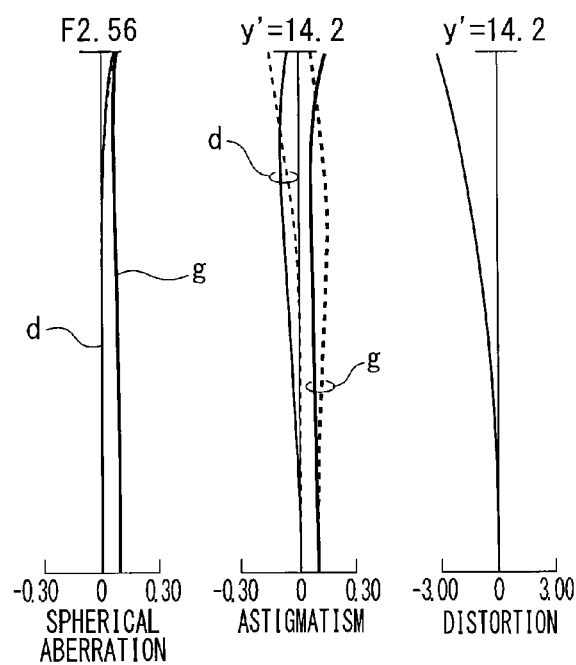
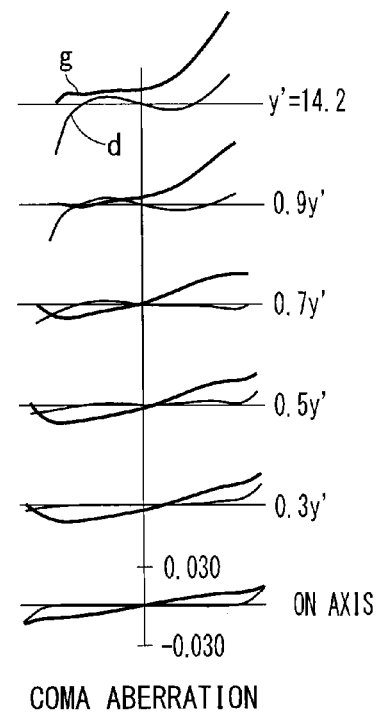
FIG. 10
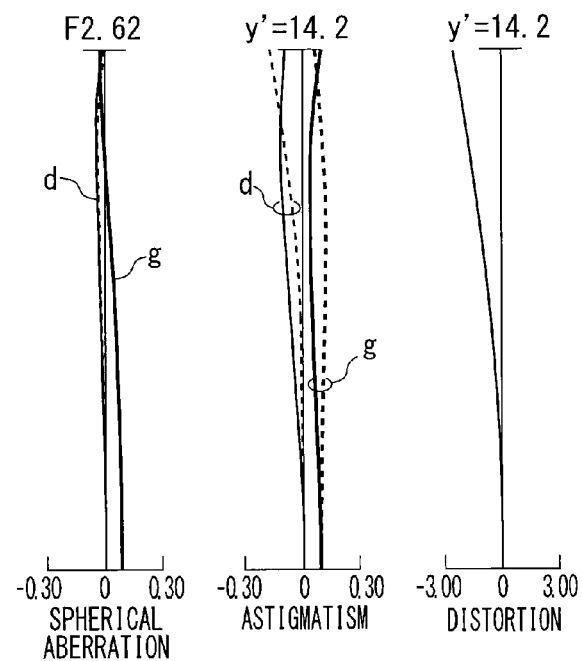
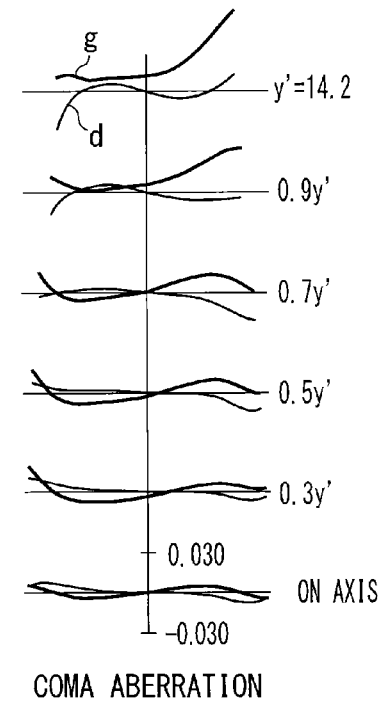

FIG.11
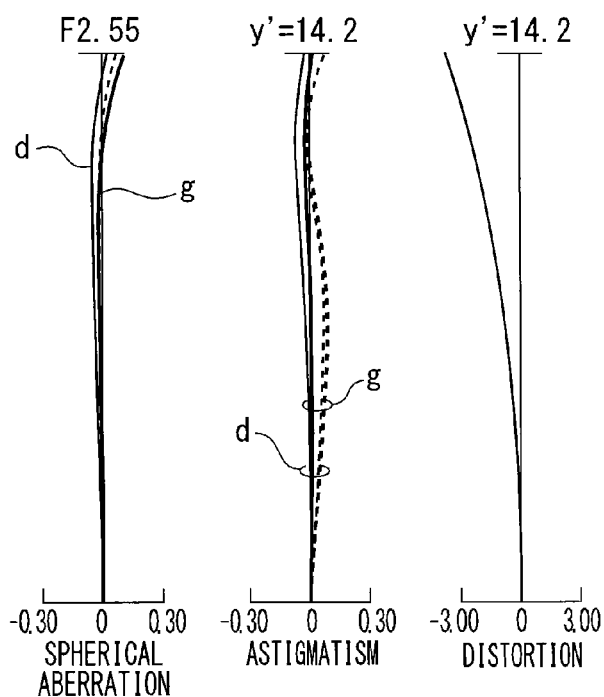
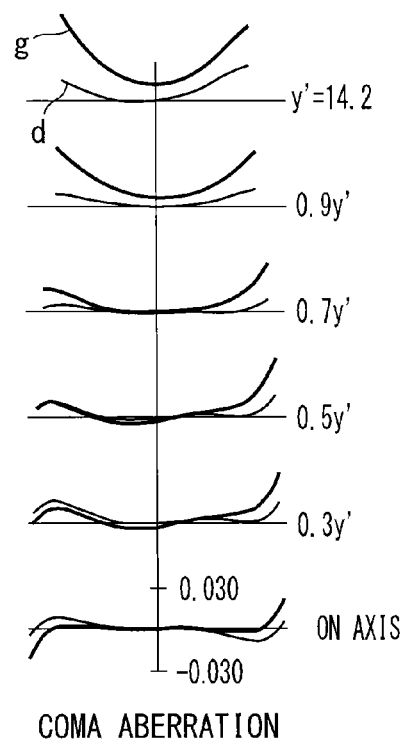
FIG.12
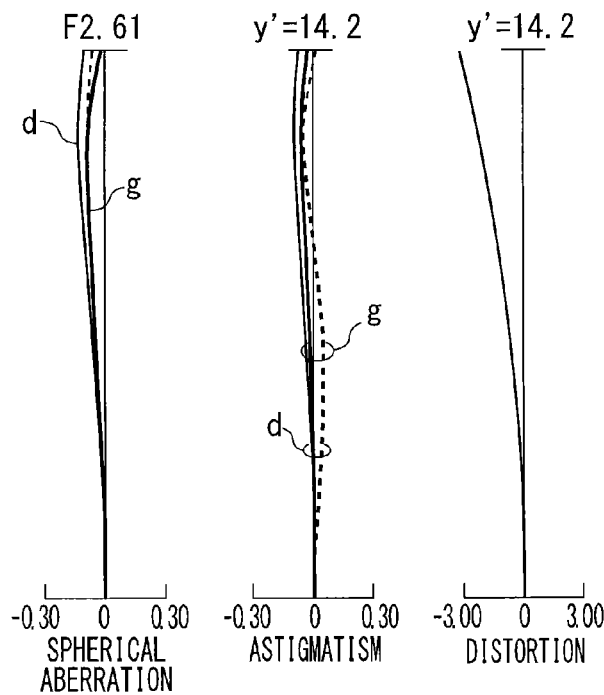
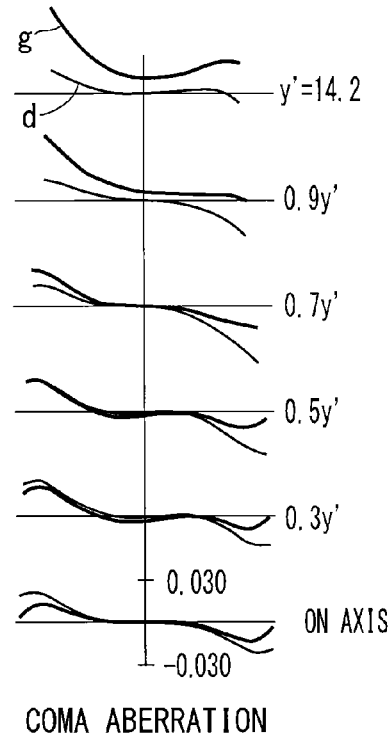

FIG.13
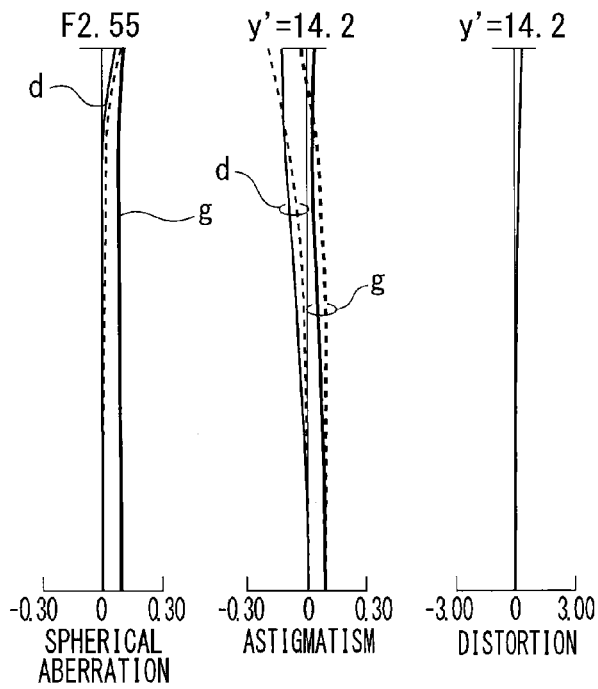
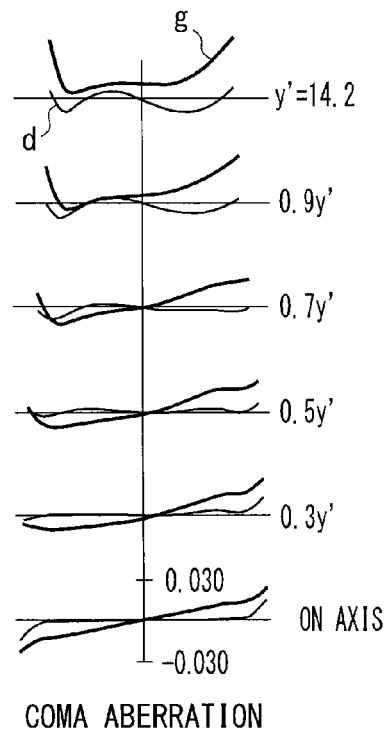
FIG.14
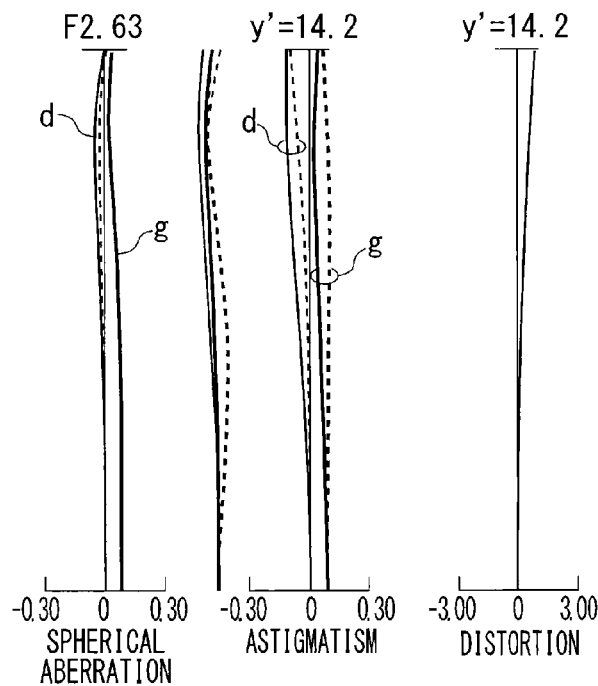
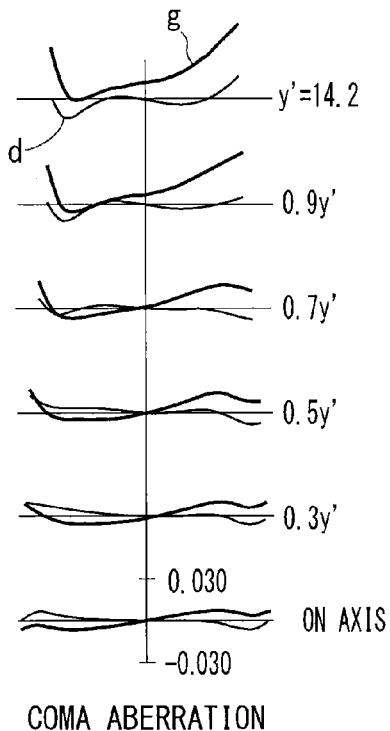

FIG.15
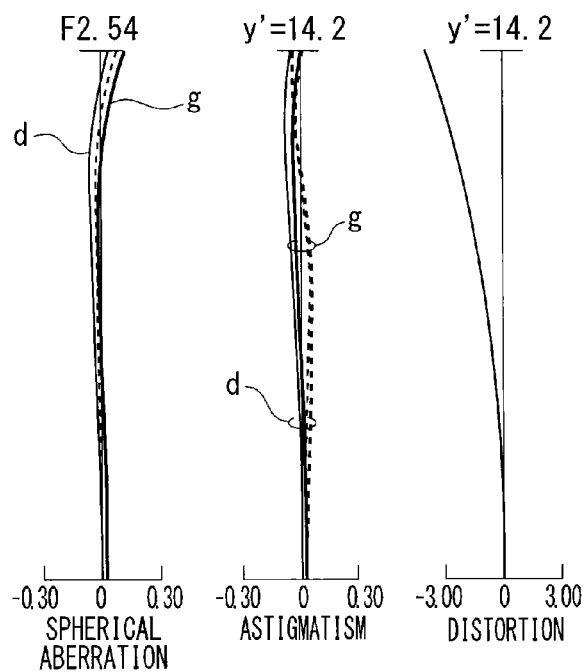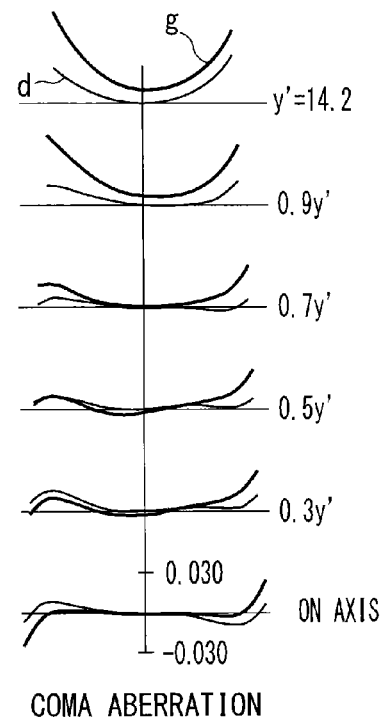
FIG.16
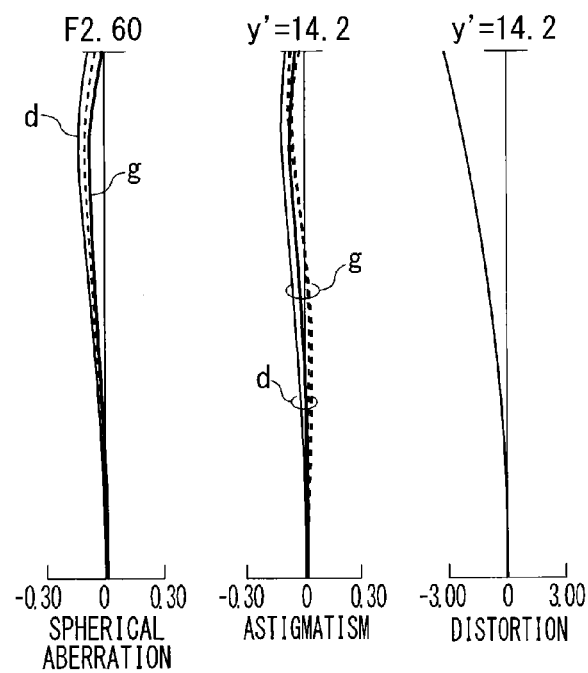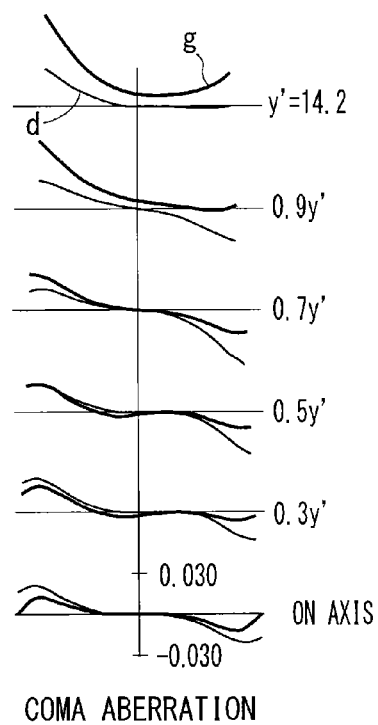

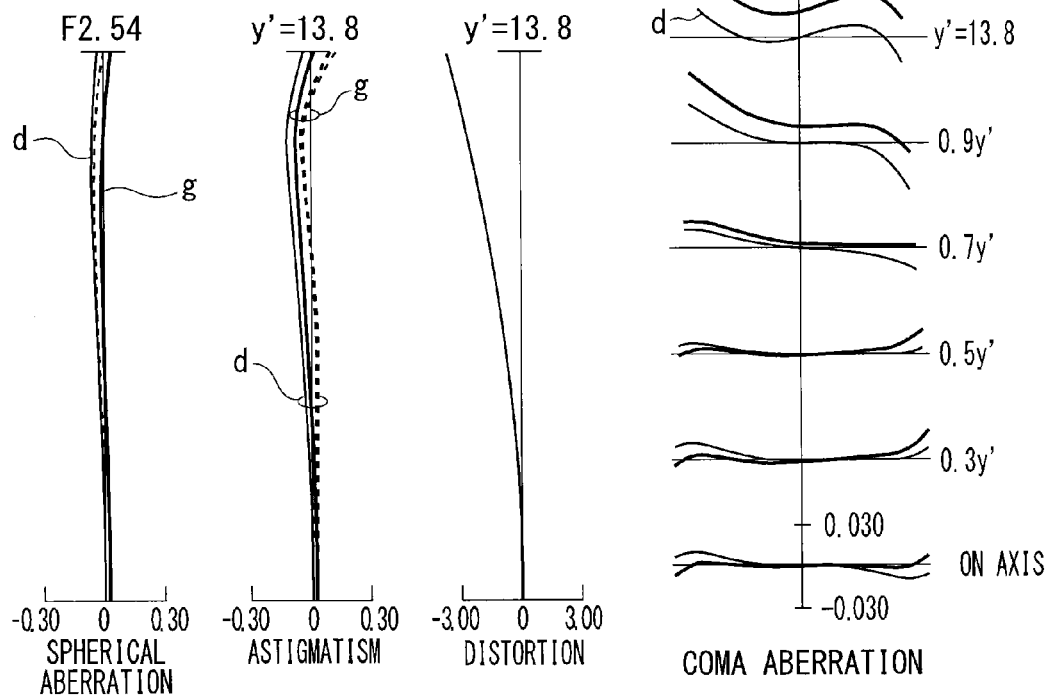
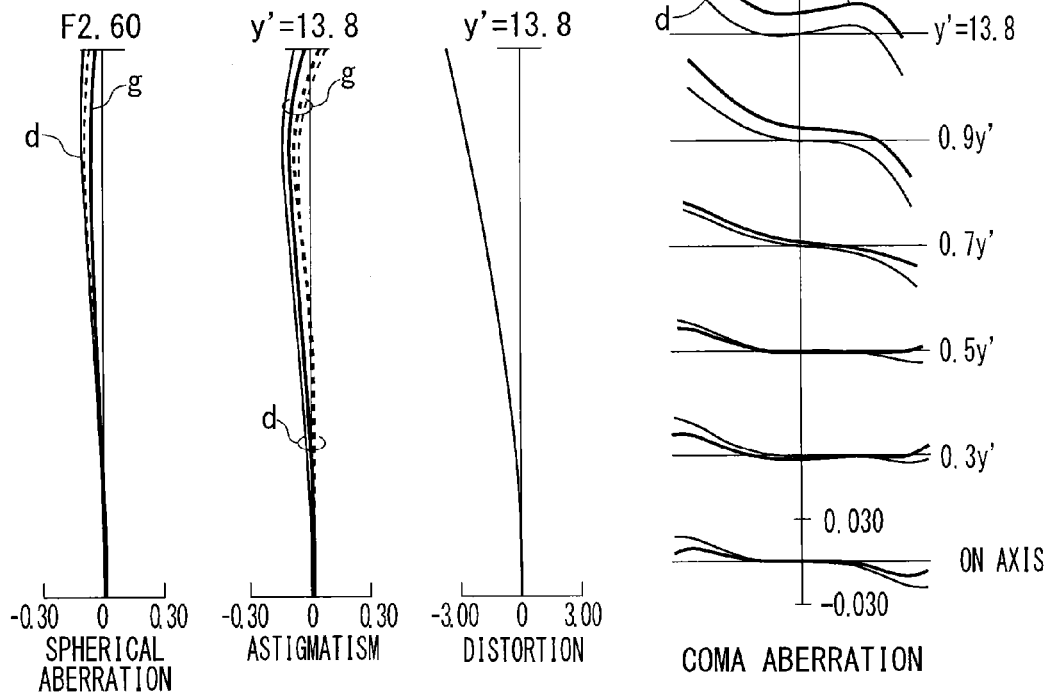

IMAGING LENS, CAMERA AND HAND-HELD DATA TERMINAL DEVICE

CROSS REFERENCE TO RELATED APPLICATION

The present application is based on and claims priority from Japanese Patent Application No. 2012-61273, filed on Mar. 16, 2012, the disclosure of which is hereby incorporated by reference in its entirety.

BACKGROUND OF THE INVENTION

1. Field of the Invention

The present invention relates to improvement in a single focus imaging lens for use in an optical system of various cameras such as silver-salf camera, digital camera, video camera, security camera. In particular, it relates to an imaging lens suitable for an imaging device incorporating an electric imaging element such as a digital camera or video camera as well as a camera and a hand-held data terminal device incorporating such an imaging lens.

2. Description of the Related Art

A digital still camera or digital video camera including a solid image sensor as CCD, CMOS is widespread. Especially, a still-image digital camera has replaced a silver salt camera. In a developed digital camera market users' demands are various and diverse. Users place great expectations on high-quality compact-size cameras incorporating a large image sensor with a width across corners of 20 mm to 45 mm and a high-performance single focus lens. Users expect a higher-performance, smaller-size, and higher-portability digital camera. In terms of high performance, such a camera needs to exert resolution equivalent to an image sensor with 10 to 20 million pixels, generate, at the maximal aperture of a diaphragm, images at a high contrast, with less coma flares, less blurs in point images even at the periphery of angle of view, less color aberration and no false color even in a portion with a large brightness difference, and less distortion. In view of a larger diameter, it requires at least F2.8 or less for the purpose of differentiating from a general compact camera mounting a zoom lens.

In view of downsizing, an actual focal length is long due to the use of a relatively large image sensor so that the total lens length standardized by a focal length or maximal image height has to be shorter than when a small image sensor is used. Further, a half angle of view is preferably 28 degrees or more with users' preference to a wide-angle lens taken into account. A half angle of view of 28 degrees is equivalent to a focal length of about 41 mm of a 35 mm silver salt camera.

A typical wide-angle, single focus lens is a retrofocus lens configured of a lens group with a negative refractive power on an object side and a lens group with a positive refractive power on an image side. The retrofocus lens can meet the demand that exit pupil position is set far from the image plane and periphery light beams should be incident on an area sensor at an almost vertical angle due to the property of the area sensor having a color filter and a micro lens on each pixel. However, the retrofocus lens originally aims to be used as a replacement lens of a single lens reflex camera and secure a back focus so that the total lens length from an object-lens surface to the image plane tends to be long.

Meanwhile, there has been progress in relatively large images sensors with width across corners of 20 to 45 mm owing to improvement or optimization of on-chip micro lenses and advanced image processing. Therefore, a diagonal incidence of periphery light beams on the sensor does not cause a large problem. For example, an optical system which allows an angle of 30 degrees or so between a principal beam and the optical axis at a maximal image height can be designed. Thus, the vertical incidence of peripheral beams does not matter much and a lens suitable for a downsized device is now available.

A symmetric type lens or a telephoto lens including a lens group with a negative refractive power on image side is more appropriate for a compact camera. Such a lens is disclosed in Japanese Patent Application Publication No. S63-24213 (Reference 1), No. H09-236746 (Reference 2), No. 2000-321490 (Reference 3), No 2005-352060 (Reference 4), and No. 2009-216858 (Reference 5), for example.

The imaging lens disclosed in Reference 1 is a telephoto lens of four groups and four lenses often used in a silver film compact camera. It is a small size but insufficient in terms of optical performance due to curvature of field and large astigmatism. The imaging lenses in References 2 and 4 are of a small size with high imaging performance but not good for a digital camera since the angle between the principal beam and optical axis exceeds 35 degrees at the maximal image height. The imaging lens of a large diameter in Reference 3 includes a large number of lenses and is not cost effective. The imaging lens in Reference 5 faces a problem in downsizing because of a large total length relative to focal length. Further, the imaging lenses in References 3 to 5 has a problem with downsizing and portability since it does not include a wide air space and secure a back focus and cannot be contained thinly even with use of a collapse mechanism.

SUMMARY OF THE INVENTION

The present invention aims to provide a wide angle, low-cost, high-performance compact imaging lens for a digital camera or a hand-held data device which has a half angle of view of 28 to 36 degrees, F number of 2.8 or less, a resolution equivalent to 10 to 20 million pixels, and less aberrations. This imaging lens can simplify and downsize a focus mechanism with a reduced variation in imaging performance when focusing on an object in a limited distance.

According to one aspect of the present invention, an imaging lens includes a first lens group having a positive refractive power on an object side and including at least three positive lenses and at least two negative lenses, and a second lens group having a negative refractive power on an image side and having a negative lens, the first and second lens groups arranged in this order from the object side with a widest air space in-between, in which in focusing an object from infinity to a close range, only the first lens group is moved to the object side and the second lens group is fixed relative to an image plane.

BRIEF DESCRIPTION OF THE DRAWINGS

Features, embodiments, and advantages of the present invention will become apparent from the following detailed description with reference to the accompanying drawings:

FIG. 7 shows the aberration curves of the imaging lens in FIG. 1 according to the first embodiment when focusing on an infinite object;

FIG. 8 shows the aberration curves of the imaging lens in FIG. 1 according to the first embodiment when focusing on a close-range object at a magnification of $-1/20$;

FIG. 9 shows the aberration curves of the imaging lens in FIG. 2 according to the second embodiment when focusing on a close-range object at infinity;

FIG. 10 shows the aberration curves of the imaging lens in FIG. 2 according to the second embodiment when focusing on a close-range object at a magnification of $-1/20$;

FIG. 11 shows the aberration curves of the imaging lens in FIG. 3 according to the third embodiment when focusing on a close-range object at infinity;

FIG. 12 shows the aberration curves of the imaging lens in FIG. 3 according to the third embodiment when focusing on a close-range object at a magnification of $-1/20$;

FIG. 13 shows the aberration curves of the imaging lens in FIG. 4 according to the fourth embodiment when focusing on an infinite object;

FIG. 14 shows the aberration curves of the imaging lens in FIG. 4 according to the fourth embodiment when focusing on a close-range object at a magnification of $-1/20$;

FIG. 15 shows the aberration curves of the imaging lens in FIG. 5 according to the fifth embodiment when focusing on a close-range object at infinity;

FIG. 16 shows the aberration curves of the imaging lens in FIG. 5 according to the fifth embodiment when focusing on a close-range object at a magnification of $-1/20$;

FIG. 17 shows the aberration curves of the imaging lens in FIG. 6 according to the sixth embodiment when focusing on a close-range object at infinity;

FIG. 18 shows the aberration curves of the imaging lens in FIG. 6 according to the sixth embodiment when focusing on a close-range object at a magnification of $-1/20$;

DETAILED DESCRIPTION OF PREFERRED EMBODIMENTS

Figure 1:
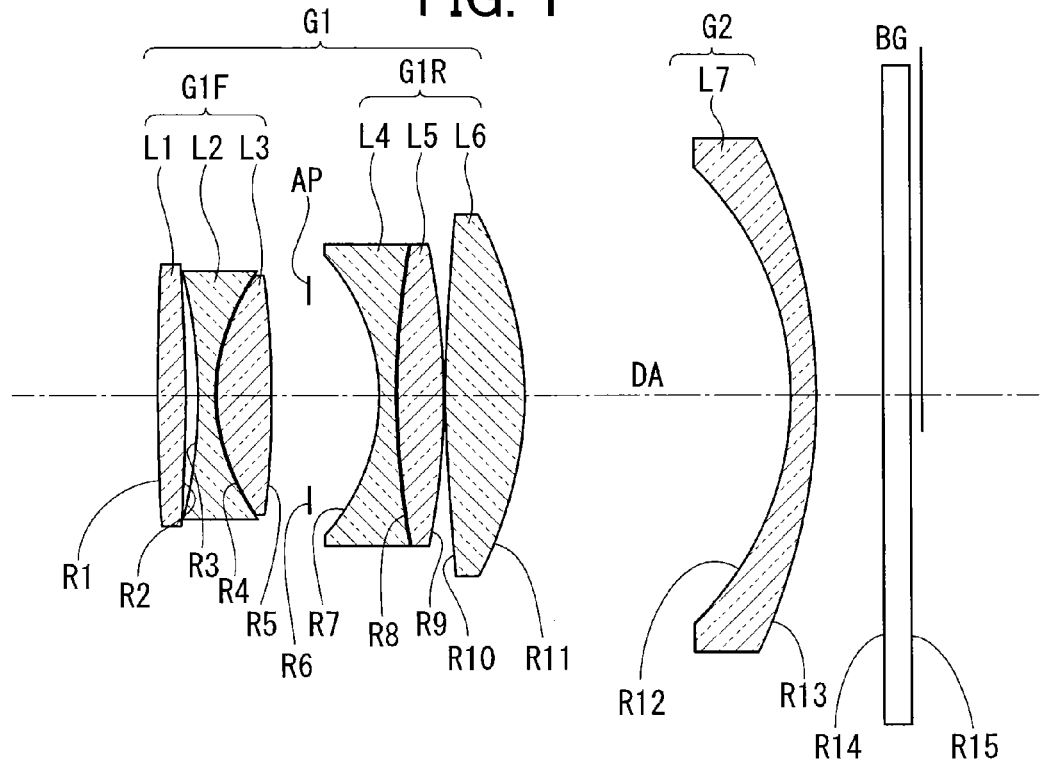
FIG. 1 is a cross section view of the optical system of an imaging lens according to a first embodiment of the present invention.

First, the principle of the present invention is described. The imaging lenses in the following embodiments aim to be downsized in the total length to resolve the problems with a telephoto lens. The telephoto lens is unsuitable for a digital camera since the incidence angle of a peripheral beam on the image plane is as large as 35 to 45 degrees. A compact, high-imaging performance telephoto lens is not cost effective since it requires a large number of lenses and spherical surfaces. One with the incidence angle of 30 degrees or less is not small enough and cannot exert high performance. Further, the telephoto imaging lens for a silver-salt camera is generally protruded entirely for focusing, so that a moving portion is large and heavy and moves at a moving large amount.

In the imaging lens according to one embodiment, only the first lens group is moved to the object side while the second lens group with a negative refractive power is fixed relative to the image plane when focusing on object at infinity to a close range. Accordingly, the moving portion can be downsized and lighter in weight compared with moving the entire lens system for focusing. Further, the second lens group is a kind of rear converter with a magnification of over 1.0. The focal length of the first lens group can be shortened than that of the entire lens system and the moving amount thereof in focusing is reduced from the total protrusion.

Moreover, the first and second lens groups are disposed with a relatively large air space. They can function as an imaging group and as a rear converter and field flattener separately and properly. Thereby, unnecessarily large aberrations can be prevented from transferring between the first and second lens groups. During non-use, the first and second lens groups can be contained thinly with a reduced interval therebetween, and is suitable for a downsized camera. In comparison with reducing the distance of a lens system from a face closest to the object side to the image plane or the distance from that closest to the object side to that closest to the image, the imaging lens as above can correct aberrations more easily, reduce the number of lenses or aspheric lens faces, and reduce manufacturing error sensitivity.

The first lens group as a focus lens is preferably configured of at least three positive lenses and at least two negative lenses. It can sufficiently correct aberrations and exert high imaging performance with a half angle of view of 28 to 36 degrees and F-number of 2.8 or less. Since aberrations are corrected by the first lens group, the second lens group can be comprised of a single negative lens and sufficiently thin although it is near the image plane and tends to be large in size.

Thus, the imaging lens is optimally designed, and a wide-range, large diameter, high-performance compact imaging lens can be realized at low cost.

Further, the first and second lens groups are arranged to satisfy the following condition:

$$0.20 < D_{1G-2G}/L < 0.50 \qquad 1.$$

where $D_{1G-2G}$ is a distance from a lens surface of the first lens group closest to the image to a lens surface of the second lens group closest to the object side when focusing on the infinite object, and L is a distance from a lens surface of the first lens group closest to the object side to the image plane when focusing on the infinite object. With the distance being below a lower limit of 0.20, the second lens group is too close to the first lens group so that it cannot sufficiently work as a field flattener to reduce curvature of field. Further, a variation in spherical aberration is increased during focusing, causing a decrease in contrast in a close range. Also, a gap between the first and second lens groups during non-use cannot be shortened enough to be contained thinly.

Meanwhile, with the distance being over the upper limit of 0.50, the first lens group as a focus lens cannot have a sufficient thickness to properly correct aberrations. To properly correct aberrations, the distance is preferably set to satisfy the following condition:

$$0.25 < D_{1G-2G}/L < 0.45$$

Further, the first and second lens groups are arranged to satisfy the following second condition:

$$0.75 < f_{1G}/f < 0.95 \qquad 2.$$

where $f_{1G}$ is a focal length of the first lens group, and f is a focal length of the entire lens system. With the parameter being below the lower limit 0.7+5, the magnifying power of the second lens group is too large so that it excessively corrects curvature of field and coma aberrations occur.

Meanwhile, with the parameter being over the upper limit of 0.95, the magnifying power of the second lens group is too close to 1.0 and a telephoto property is decreased. Thus, the total lens length cannot be shortened. In addition the second lens group cannot function as a field flatter sufficiently to properly correct curvature of field.

The negative lens of the second lens group is preferably a meniscus lens with a concave surface on the object side which can optimally work as a field flattener.

To improve the flatness of the image plane, the second lens group is configured to satisfy the following third condition:

$$-6.5 < (R_{2GF} + R_{2GR})/(R_{2GF} - R_{2GR}) < -1.0 \qquad 3$$

where $R_{2GF}$ is a curvature radius of an object-side surface of the negative lens, and $R_{2GR}$ is a curvature radius of an image side surface thereof. With the parameter being below the lower limit of −6.5, the negative lens of the second lens group exerts too large bending to excessively correct curvature of field. Meanwhile, with the parameter being over the upper limit of −1.0, the bending of the second lens group is too low to correct curvature of field properly.

Further, the first lens group preferably includes an aperture diaphragm, a front lens group arranged closer to the object side than the aperture diaphragm, and a rear lens group arranged closer to the image side than the aperture diaphragm. The first lens group is configured to satisfy the following fourth condition:

$$1.0 < f_{G1F}/f < 2.0 \qquad 4.$$

where $f_{G1F}$ is a focal length of the front lens group and f is a focal length of the entire lens system. With the parameter being below the lower limit of 1.0, the refractive power of the lenses closer to the object side than the aperture diaphragm is heightened and that of the lenses closer to the image side is weakened so that a sufficient exit pupil distance cannot be secured. With the parameter being over the upper limit of 2.0, the refractive power of the lenses closer to the image side than the aperture diaphragm is heightened and that of the lenses closer to the object side is weakened, which likely causes a negative distortion. With the parameter outside the range of the condition, the other aberrations will be off-balanced.

Moreover, the rear lens group preferably includes a negative lens closest to the object and having a concave surface on the object side and is preferably configured to satisfy the following fifth condition:

$$-2.5 < R_{1RGF}/D_{1FG-1RG} < -1.0 \qquad 5.$$

where $R_{1RGF}$ is a curvature radius of the concave surface of the negative lens and $D_{1FG-1RG}$ is a distance from a lens surface of the front lens group closest to the image to a lens surface of the rear lens group closest to the object. With the parameter being below the lower limit of −2.5, a coma aberration in inner orientation is likely to occur while with the parameter being over the upper limit of −1.0, that in outer orientation is likely to occur. If a shutter in addition to the aperture diaphragm is provided between the front and rear lens groups, a space therefor cannot be acquired with the parameter being over the upper limit of −1.0, To properly correct coma aberrations and astigmatism, the rear lens group preferably includes an aspheric surface shaped such that the closer to a periphery a portion is, the smaller a positive refractive power the portion has. The rear lens group is preferably configured to satisfy the following sixth condition:

$$0.25 < L_{S-A}/L_{S-I} < 0.55 \qquad 6.$$

where $L_{S-A}$ is a distance from the aperture diaphragm to the aspheric surface and $L_{S-I}$ is a distance from the aperture diaphragm to the image plane.

With the parameter being below the lower limit of 0.25, the aspheric surface approaches the aperture diaphragm too closely, and the center and periphery of a light beam are not separated enough to correct astigmatism. With the parameter being over the upper limit 0.55, the aspheric surface is too far from the aperture diaphragm, and a light beam cannot be formed in diameter enough to correct coma aberrations.

Further, the rear lens group preferably comprises, from the object side, a negative lens with a concave surface on the object side, a positive lens with a convex surface on the image side, and a positive lens with a convex surface on the image side. The object-side surface of the negative lens and the image-side surface of the positive lens are approximately concentric relative to the aperture diaphragm, aiming for prevention of coma aberration. Also, owing to the refractive power of the two positive lenses, the exit pupil can be at an appropriate position far from the image plane. Furthermore, the negative lens of the rear lens group closest to the object side is preferably bonded with the positive lens adjacent to the negative lens on the image side. This can reduce substantive manufacturing error sensitivity which would otherwise occur due to the transfer of aberration between the two lens surfaces in question. This also leads to decreasing the number of parts of a lens barrel to hold the imaging lens and achieving a stable performance.

Moreover, the imaging lens is preferably configured to satisfy the following seventh condition in order to limit the entire lens length:

$$1.2 < L/f < 2.0 \qquad 7.$$

With the parameter being below the lower limit of 1.2, overall aberration correction becomes difficult. With the parameter being over the upper limit of 2.0, the optical system can be properly designed without the use of the imaging lens according to one embodiment.

Further, the imaging lens is configured to satisfy the following eighth and ninth conditions in order to limit the angle of view of the imaging lens and the incidence angle of an off-axial beam on the image plane, respectively:

$$0.50 < Y'/f < 0.75 \qquad 8.$$

$$0.50 < \tan(\theta P_{max}) < 0.70 \qquad 9.$$

where Y' is a maximal image height and $\theta P_{max}$ is an incidence angle of a principal beam reaching the maximal image height on the image plane, and f is a focal length of the entire lens system in focusing on the infinite object.

Specifically, at least three positive lenses of the first lens group are configured to satisfy the following tenth and eleventh conditions:

$$1.75 < n_{dpa} < 1.95 \qquad 10.$$

$$35.0 < \nu_{dpa} < 50.0 \qquad 11.$$

where $n_{dpa}$ is a mean value of the refractive indexes of the positive lenses and $\nu_{dpa}$ is a mean value of the abbe numbers thereof.

The three positive lenses formed from a material with a high refractive index and low dispersion satisfying the two conditions can reduce curvature of field and color aberrations. More preferably, the first lens group includes an aspheric surface for the purpose of effectively correct spherical aberration and coma aberration which increase along with a larger diameter lens.

Hereinafter, embodiments of the present invention will be described in detail with reference to the accompanying drawings. Wherever possible, the same reference numbers will be used throughout the drawings to refer to the same or like parts.

It will become apparent from the following first to sixth embodiments that the imaging lens can properly correct spherical aberrations, astigmatism, curvature of field, and chromatic aberration of magnification, and a large diameter imaging lens with a half angle of 28 to 36 degrees, F-number of 2.8 or less and high imaging performance can be realized.

Symbols and codes used hereinafter denote as follows:
f: total focal length of lens system
F: F-number
R: curvature radius of lens surface (paraxial curvature radius of aspheric surface)
D: interval between two lens surfaces on the axis
Nd: refractive index
vd: Abbe number
ω: half field of angle (degree)

Moreover, the imaging lenses according to the first to sixth embodiments each include aspheric surfaces. The aspheric surfaces can be formed directly by molding or by forming a thin resin film on spherical surfaces such as a hybrid aspheric lens. The aspheric surface is expressed by the following known formula:

$$X = \frac{cH^2}{1 + \sqrt{\{1 - (1+K)c^2H^2\}}} + A_4 \cdot H^4 + A_6 \cdot H^6 + A_8 \cdot H^8 + A_{10} \cdot H^{10}$$

where X is an amount of asphericity along the optical axis, c is a paraxial curvature (inverse of paraxial curvature radius), H is height from the optical axis, k is a conic constant and $A_4$, $A_6$, $A_8$, $A_{10}$, . . . fourth, sixth, eighth, tenth, . . . aspheric constants.

First Embodiment

The imaging lens according to the first embodiment is described with reference to FIG. 1. FIG. 1 cross-sectionally shows the configuration of the imaging lens when focusing on an object at infinity. The imaging lens in FIG. 1 is comprised of first to third lenses L1 to L3, an aperture diaphragm AP, fourth to seventh lenses L4 to L7 arranged in this order from the object side to the image plane. The second and third lenses L2, L3 are a cemented lens and so are the fourth and fifth lenses L4, L5. Thus, it is comprised of 5 groups and 7 lenses.

Further, the lenses are integrally moved as a first lens group G1 with a positive refractive power and a second lens group G2 with a negative refractive power arranged in this order from the object side. Each of the first and second lens groups G1, G2 is supported in a frame and the first lens group G1 is moved along the optical axis for focusing. A largest air space DA is variably provided between the first and second lens groups G1, G2.

The first lens group G1 is comprised of the first to sixth lenses L1 to L6. The first lens L1 is a positive lens with two convex surfaces, a larger convex on the image side. The second lens L2 is a negative lens with two concave surfaces, a larger concave on the image side. The third lens L3 is a positive lens with two convex surfaces, a larger convex on the object side. The fourth lens L4 is a negative lens with two concave surfaces, a larger concave on the object side. The fifth lens L5 is a positive lens with two convex surfaces, a larger convex on the image side. The sixth lens L6 is a positive lens with two convex surfaces, a larger convex on the image side.

Also, the first lens group G1 includes the aperture diaphragm AP, a front lens group G1F and a rear lens group G1R placing the aperture diaphragm in-between. The front lens group G1F on the object side includes the lenses L1 to L3 and the rear lens group G1R on the image side includes the fourth to sixth lenses L4 to L6. The second lens group G2 is the seventh lens L7 as a negative meniscus lens with a larger concave surface on the object side.

A back glass BG is disposed behind the first and second lens groups G1, G2 on the image side. Alternatively, any of a lowpass filter, infrared cut glass, and cover glass to protect the light receiving surface of a solid image sensor can be used. An imaging system for a digital still camera using a solid image sensor as CCD or CMOS generally includes any of these elements. In the first to sixth embodiments the back glass BG is regarded as a single plane parallel plate. The single plane parallel plate is placed with an image-side surface at a position about 0.5 mm away from the image plane by way of example. It should not be limited to such an example. It can be divided into plural plates.

In focusing on an object from a limited or close range to infinity, only the first lens group G1 is moved along the optical axis to protrude while the second lens group G2 is fixed. FIGS. 1 to 6 also show lens surfaces R1 to R15 and the same reference numbers are used therein, however, the lenses may be differently configured.

In the first embodiment the total focal length f of the lens system is 22.90 mm, a half angle of view ω is 32.2 degrees, and F-number is 2.55. The following table 1 shows specific data on the optical property of the lenses such as the curvature radius (paraxial curvature radius on aspheric surfaces) R, interval D between the neighboring lens faces, refractive index $N_d$, and Abbe number $v_d$. Note that throughout the embodiments, in the tables HOYA refers to a glass manufacturer, HOYA CORPORATION, and OHARA refers to OHARA Inc. Face numbers with asterisk * are aspheric surfaces.

TABLE 1

| SURFACE NUMBER | R | D | $N_d$ | $v_d$ | $P_{g,F}$ | GLASS NAME | NOTE | |
|---|---|---|---|---|---|---|---|---|
| 01 | 109.515 | 1.29 | 1.90366 | 31.32 | 0.5947 | HOYA TAFD25 | L1 | G1 |
| 02 | −101.736 | 0.63 | | | | | | |
| 03 | −21.298 | 0.80 | 1.60342 | 38.03 | 0.5835 | OHARA S-TIM5 | L2 | |
| 04 | 8.710 | 2.66 | 1.83481 | 42.73 | 0.5648 | OHARA S-LAH55V | L3 | |
| 05 | −41.531 | 1.80 | | | | | | |
| 06 | APERTURE | 3.30 | | | | | | |
| 07 | −9.145 | 0.87 | 1.76182 | 26.52 | 0.6136 | OHARA S-TIH14 | L4 | |

TABLE 1-continued

| SURFACE NUMBER | R | D | $N_d$ | $v_d$ | $P_{g,F}$ | GLASS NAME | NOTE | |
|---|---|---|---|---|---|---|---|---|
| 08 | 36.988 | 2.26 | 1.83481 | 42.73 | 0.5648 | OHARA S-LAH55V | L5 | |
| 09 | −32.285 | 0.10 | | | | | | |
| 10 | 74.823 | 3.67 | 1.80610 | 40.73 | 0.5465 | HOYA M-NBFD130 | L6 | |
| 11* | −14.560 | VARIABLE(DA) | | | | | | |
| 12 | −14.000 | 1.20 | 1.48749 | 70.23 | 0.5300 | OHARA S-FSL5 | L7 | G2 |
| 13 | −25.496 | 12.61 | | | | | | |
| 14 | ∞ | 1.30 | 1.51680 | 64.20 | | Filter | BG | |
| 15 | ∞ | | | | | | | |

In the table 1 the eleventh surface R11 of the sixth lens L6 is aspheric. The aspheric parameters or coefficients of the 11$^{th}$ surface R11 in the known formula are as follows.

$K=0.0$ $A_4=7.45972\times10^{-5}$ $A_6=2.74768\times10^{-7}$ $A_8=-2.29955\times10^{-10}$ $A_{10}=0.0$ In the first embodiment the air space DA between the sixth lens L6 of the first lens group G1 and the seventh lens L7 of the second lens group G2 is variable. The following table 2 shows the values of the air space when an object distance is changed to infinity and −1/20 (about object distance 500 mm) due to a magnification change.

TABLE 2

| | INFINITE | −1/20 |
|---|---|---|
| DA | 12.610 | 13.560 |

Further, the values of the parameters in the first to eleventh conditions are as follows.

$D_{1G-2G}/L=0.348$   1.

$f_{1G}/f=0.911$   2.

$(R_{2GF}+R_{2GR})/(R_{2GF}-R_{2GR})=-3.44$   3.

$f_{1FG}/f=1.25$   4.

$R_{1RGF}/D_{1FG-1RG}=-1.79$   5.

$L_{S-A}/L_{S-I}=0.351$   6.

$L/f=1.58$   7.

$Y'/f=0.620$   8.

$\tan(\theta P_{max})=0.536$   9.

$n_{dpa}=1.825$   10.

$v_{dpa}=42.1$   11.

Thus, the imaging lens according to the first embodiment satisfies the first to eleventh conditions.

FIG. 7 shows the aberration curves of the imaging lens according to the first embodiment at d-line and g-line when focusing on an infinite object and FIG. 8 shows the same when focusing on a close-range object at a magnification of −1/20. Throughout the embodiments, in the aberration curves a broken line in the spherical aberration represents sine condition, a broken line and a solid line in the astigmatism represent a meridional and a sagittal, respectively.

Second Embodiment

Figure 2:
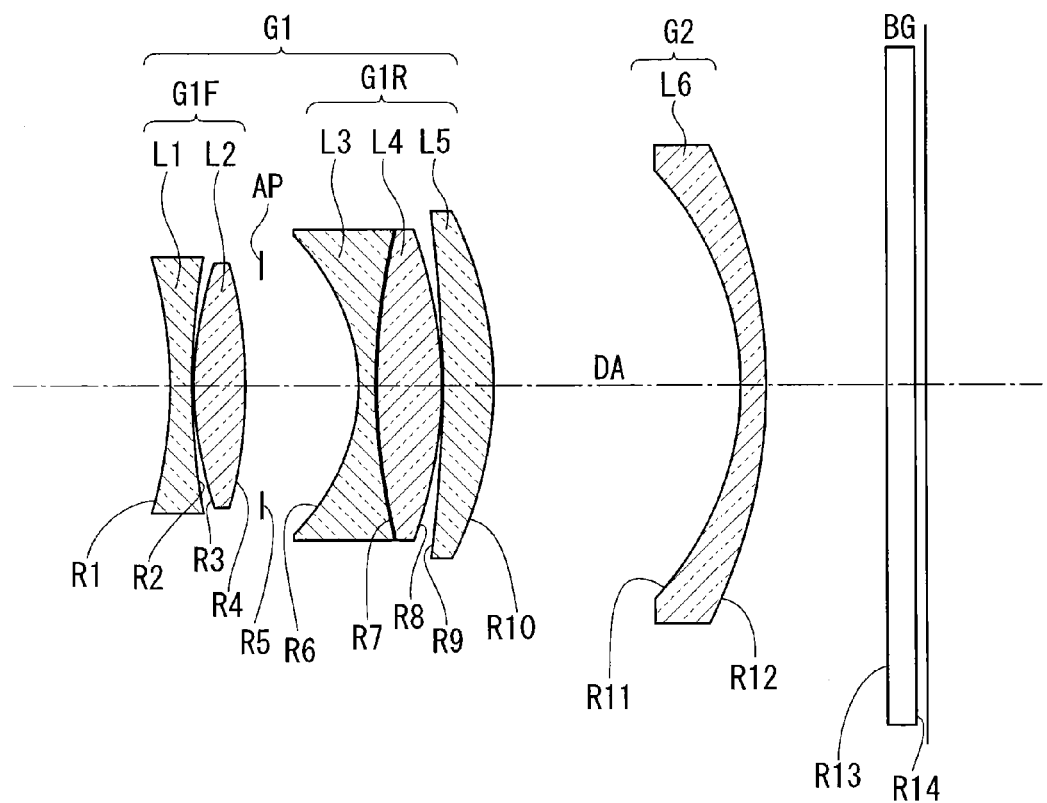
FIG. 2 is a cross section view of the optical system of an imaging lens according to a second embodiment of the present invention.

The imaging lens according to a second embodiment is described referring to FIG. 2. For the sake of simplicity, only a difference from the first embodiment is described. FIG. 2 cross-sectionally shows the configuration of the imaging lens in focusing at infinity. The imaging lens in FIG. 2 is comprised of first to second lenses L1 to L2, aperture diaphragm AP, third to sixth lenses L3 to L6 arranged in this order from the object side to the image plane. The third and fourth lenses L3, L4 are a cemented lens. Thus, it is comprised of 5 groups and 6 lenses.

Further, the lenses are integrally moved as a first lens group G1 with a positive refractive power and a second lens group G2 with a negative refractive power in this order from the object side. Each of the first and second lens groups G1, G2 is supported in a frame and the first lens group G1 is moved along the optical axis for focusing. A largest air space DA is variably provided between the first and second lens groups G1, G2 as in the first embodiment.

The first lens group G1 is comprised of the first to fifth lenses L1 to L5. The first lens L1 is a negative lens with two concave surfaces, a larger concave surface on the object side. The second lens L2 is a positive lens with two convex surfaces, a larger convex on the object side. The third lens L3 is a negative lens with two concave surfaces, a larger concave on the object side. The fourth lens L4 is a positive lens with two convex surfaces, a larger convex on the image side. The fifth lens L5 is a positive meniscus lens with two convex surfaces, a larger convex on the image side.

Also, the first lens group G1 includes the aperture diaphragm AP, a front lens group G1F and a rear lens group G1R placing the aperture diaphragm in-between. The front lens group G1F on the object side includes the first and second lenses L1 to L2 and the rear lens group G1R on the image side includes the third to fifth lenses L3 to L5. The second lens group G2 is the sixth lens L6 as a negative meniscus lens with a larger concave surface on the object side. A back glass BG is disposed behind the first and second lens groups G1, G2 on the image side.

As in the first embodiment, in focusing on an object from a limited or close range to infinity, only the first lens group G1 is moved along the optical axis to protrude while the second lens group G2 is fixed.

In the second embodiment the total focal length f of the lens system is 22.99 mm, a half angle of view ω is 32.5 degrees, and F-number is 2.56. The following table 3 shows specific data on the optical property of the lenses.

TABLE 3

| SURFACE NUMBER | R | D | $N_d$ | $v_d$ | $P_{g,F}$ | GLASS NAME | NOTE | |
|---|---|---|---|---|---|---|---|---|
| 01* | −19.042 | 1.00 | 1.68893 | 31.16 | 0.6037 | HOYA M-FD80 | L1 | G1 |
| 02 | 32.587 | 0.10 | | | | | | |
| 03 | 17.848 | 2.33 | 1.88300 | 40.80 | 0.5654 | HOYA TAFD30 | L2 | |
| 04 | −21.421 | 0.80 | | | | | | |
| 05 | APERTURE | 4.39 | | | | | | |
| 06 | −8.787 | 0.80 | 1.68893 | 31.16 | 0.5989 | HOYA E-FD8 | L3 | |
| 07 | 24.308 | 3.01 | 1.83481 | 42.72 | 0.5653 | HOYA TAFD5F | L4 | |
| 08 | −19.079 | 0.10 | | | | | | |
| 09 | −59.475 | 2.36 | 1.77387 | 47.25 | 0.5557 | HIKARI Q-LASFH11 | L5 | |
| 10* | −14.339 | VARIABLE(DA) | | | | | | |
| 11 | −13.524 | 1.20 | 1.67270 | 32.17 | 0.5962 | HOYA E-FD5 | L6 | G2 |
| 12 | −22.904 | 5.619 | | | | | | |
| 13 | ∞ | 1.30 | 1.51680 | 64.20 | | Filter | BG | |
| 14 | ∞ | | | | | | | |

In the table 3 the first and tenth surfaces R1 and R10 of the first and fifth lenses L1, L5 are aspheric. The aspheric parameters or coefficients of the $1^{st}$ and $10^{th}$ surfaces in the known formula are as follows.

First Surface R1

$K=0.0,$ $A_4=-6.48729\times10^{-5}$ $A_6=-3.64206\times10^{-7}$ $A_8=9.41909\times10^{-9}$ $A_{10}=-2.27481\times10^{-10}$ Tenth Surface R10

$K=0.0$ $A_4=5.05271\times10^{-5}$ $A_6=3.24752\times10^{-7}$ $A_8=-1.48743\times10^{-09}$ $A_{10}=3.86782\times10^{-11}$ In the second embodiment the air space DA between the fifth lens L5 of the first lens group G1 and the sixth lens L6 of the second lens group G2 is variable. The following table 2 shows the values of the air space when an object distance is changed to infinity and −1/20 (about object distance 500 mm) due to a magnification change.

TABLE 4

| | INFINITE | −1/20 |
|---|---|---|
| DA | 11.290 | 12.129 |

Further, the values of the parameters in the first to eleventh conditions are as follows.

$D_{1G-2G}/L=0.324$                     1.

$f_{1G}/f=0.854$                           2.

$(R_{2GF}+R_{2GR})/(R_{2GF}-R_{2GR})=-3.89$    3.

$f_{1FG}/f=1.22$                           4.

$R_{1RGF}/D_{1FG-1RG}=-1.69$              5.

$L_{S-A}/L_{S-I}=0.349$                    6.

$L/f=1.51$                                 7.

$Y'/f=0.617$                               8.

$\tan(\theta P_{max})=0.554$               9.

$n_{dpa}=1.831$                            10.

$v_{dpa}=43.4$                             11.

Thus, the imaging lens according to the second embodiment satisfies the first to eleventh conditions.

FIG. 9 shows the aberration curves of the imaging lens according to the first embodiment at d-line and g-line when focusing on an infinite object and FIG. 10 shows the same when focusing on a close-range object at a magnification of −1/20.

Third Embodiment

Figure 3:
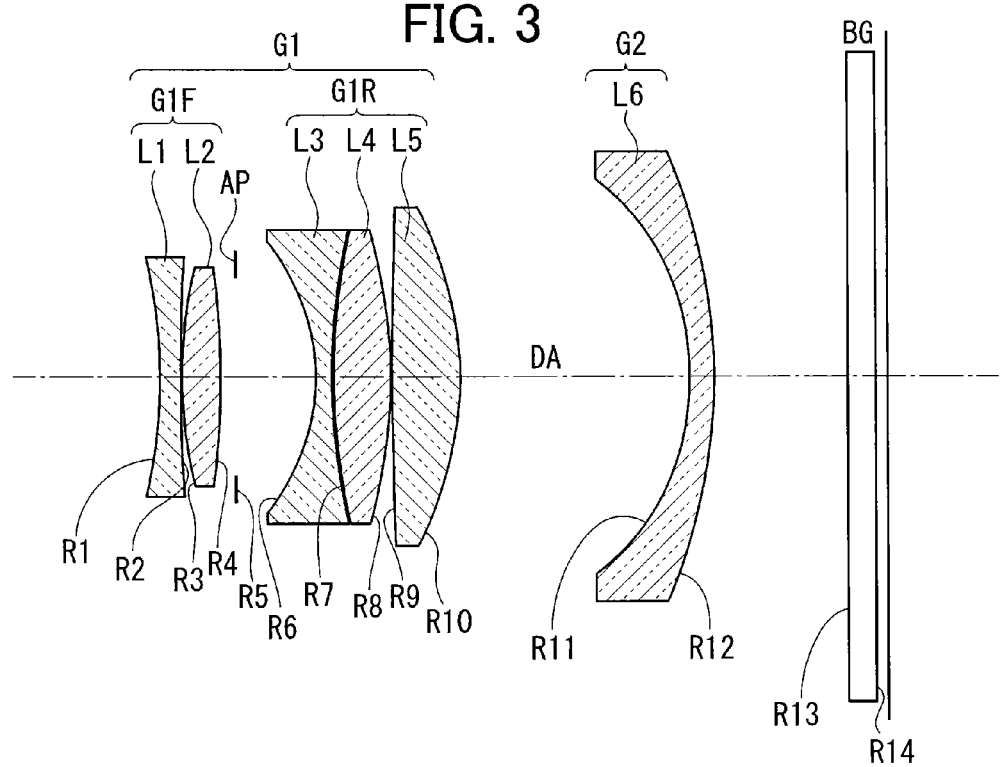
FIG. 3 is a cross section view of the optical system of an imaging lens according to a third embodiment of the present invention.

The imaging lens according to a third embodiment is described referring to FIG. 3. For the sake of simplicity, only a difference from the first embodiment is described. FIG. 3 cross-sectionally shows the configuration of the imaging lens in focusing at infinity. The imaging lens in FIG. 3 is comprised of first to second lenses L1 to L2, an aperture diaphragm AP, third to sixth lenses L3 to L6 arranged in this order from the object side to the image plane. The third and fourth lenses L3, L4 are a cemented lens. Thus, it is comprised of 5 groups and 6 lenses.

Further, the lenses are integrally moved as a first lens group G1 with a positive refractive power and a second lens group G2 with a negative refractive power in this order from the object side. Each of the first and second lens groups G1, G2 is supported in a frame and the first lens group G1 is moved along the optical axis for focusing. A largest air space DA is variably provided between the first and second lens groups G1, G2 as in the first embodiment.

The first lens group G1 is comprised of the first to fifth lenses L1 to L5. The first lens L1 is a negative lens with two concave surfaces, a larger concave surface on the object side. The second lens L2 is a positive lens with two convex surfaces, a larger convex on the object side. The third lens L3 is a negative lens with two concave surfaces, a larger concave on the object side. The fourth lens L4 is a positive lens with two convex surfaces, a larger convex on the image side. The fifth lens L5 is a positive lens with two convex surfaces, a larger convex on the image side.

Also, the first lens group G1 includes the aperture diaphragm AP, a front lens group G1F and a rear lens group G1R placing the aperture diaphragm in-between. The front lens group G1F on the object side includes the first and second lenses L1 to L2 and the rear lens group G1R on the image side includes the third to fifth lenses L3 to L5. The second lens group G2 is the sixth lens L6 as a negative meniscus lens with a larger concave surface on the object side. A back glass BG is disposed behind the first and second lens groups G1, G2 on the image side.

As in the first embodiment, in focusing on an object from a limited or close range to infinity, only the first lens group G1 is moved along the optical axis to protrude while the second lens group G2 is fixed.

In the second embodiment the total focal length f of the lens system is 22.99 mm, a half angle of view ω is 32.7 degrees, and F-number is 2.55. The following table 5 shows specific data on the optical property of the lenses.

TABLE 5

| SURFACE NUMBER | R | D | $N_d$ | $v_d$ | $P_{g,F}$ | GLASS NAME | NOTE | |
|---|---|---|---|---|---|---|---|---|
| 01 | −23.416 | 1.00 | 1.54814 | 45.78 | 0.5686 | OHARA S-TIL1 | L1 | G1 |
| 02 | 128.083 | 0.10 | | | | | | |
| 03 | 23.801 | 1.74 | 1.88300 | 40.76 | 0.5667 | OHARA S-LAH58 | L2 | |
| 04 | −44.679 | 0.80 | | | | | | |
| 05 | APERTURE | 3.81 | | | | | | |
| 06 | −9.949 | 0.80 | 1.80518 | 25.42 | 0.6161 | OHARA S-TIH6 | L3 | |
| 07 | 26.658 | 2.78 | 1.88300 | 40.76 | 0.5667 | OHARA S-LAH58 | L4 | |
| 08 | −24.229 | 0.10 | | | | | | |
| 09 | 270.532 | 3.23 | 1.85400 | 40.39 | 0.5677 | OHARA L-LAH85 | L5 | |
| 10* | −15.271 | VARIABLE(DA) | | | | | | |
| 11 | −11.494 | 1.20 | 1.48749 | 70.24 | 0.5300 | OHARA S-FSL5 | L6 | G2 |
| 12 | −24.356 | 6.474 | | | | | | |
| 13 | ∞ | 1.30 | 1.51680 | 64.20 | | Filter | BG | |
| 14 | ∞ | | | | | | | |

In the table 5 the tenth surface R10 of the fifth lens L5 is aspheric. The aspheric parameters or coefficients of the $10^{th}$ surface R10 in the known formula are as follows.

$K=0.0$ $A_4=4.68271\times10^{-5}$ $A_6=-7.49722\times10^{-8}$ $A_8=3.11817\times10^{-09}$ $A_{10}=-1.79903\times10^{-11}$ In the third embodiment the air space DA between the fifth lens L5 of the first lens group G1 and the sixth lens L6 of the second lens group G2 is variable. The following table 6 shows the values of the air space when an object distance is changed to infinity and −1/20 (about object distance 500 mm) due to a magnification change.

TABLE 6

| | INFINITE | −1/20 |
|---|---|---|
| DA | 10.990 | 11.783 |

Further, the values of the parameters in the first to eleventh conditions are as follows.

$D_{1G-2G}/L=0.316$  1.

$f_{1G}/f=0.830$  2.

$(R_{2GF}+R_{2GR})/(R_{2GF}-R_{2GR})=-2.79$  3.

$f_{1FG}/f=1.45$  4.

$R_{1RGF}/D_{1FG-1RG}=-2.16$  5.

$L_{S-A}/L_{S-I}=0.344$  6.

$L/f=1.51$  7.

$Y'/f=0.618$  8.

$\tan(\theta P_{max})=0.547$  9.

$n_{dpa}=1.873$  10.

$v_{dpa}=40.6$  11.

Thus, the imaging lens according to the third embodiment satisfies the first to eleventh conditions.

FIG. 11 shows the aberration curves of the imaging lens according to the third embodiment at d-line and g-line when focusing on an infinite object and FIG. 12 shows the same when focusing on a close-range object at a magnification of −1/20.

Fourth Embodiment

Figure 4:
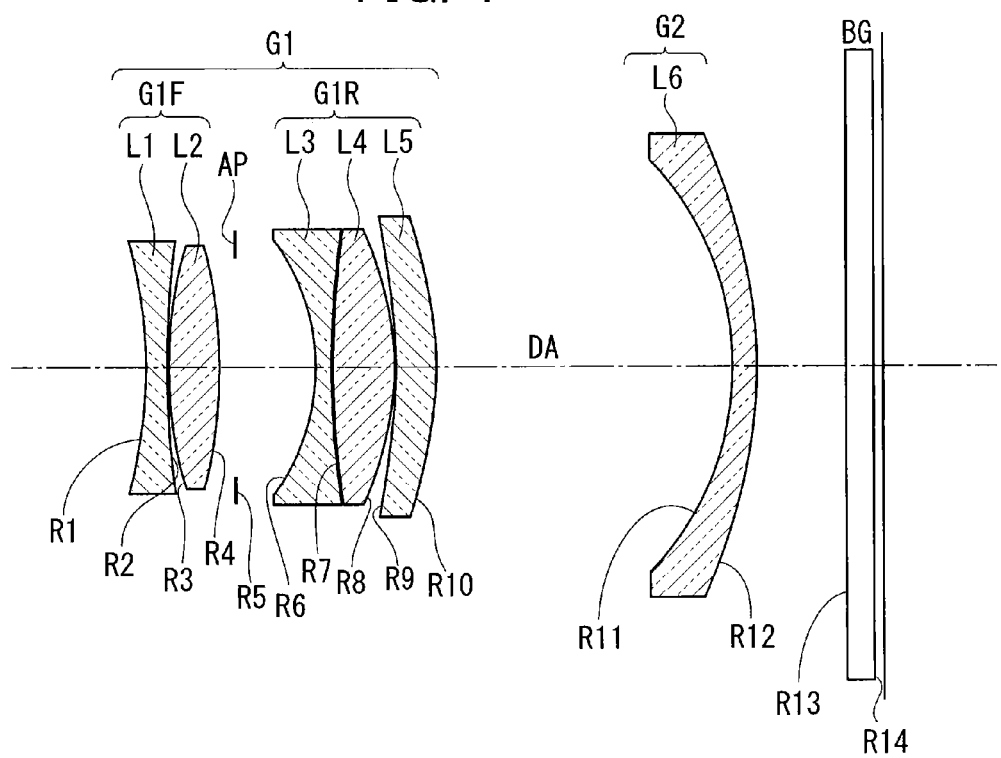
FIG. 4 is a cross section view of the optical system of an imaging lens according to a fourth embodiment of the present invention.

The imaging lens according to a fourth embodiment is described referring to FIG. 4. For the sake of simplicity, only a difference from the first embodiment is described. FIG. 4 cross-sectionally shows the configuration of the imaging lens in focusing at infinity. The imaging lens in FIG. 4 is comprised of first to second lenses L1 to L2, aperture diaphragm AP, third to sixth lenses L3 to L6 arranged in this order from the object side to the image plane. The third and fourth lenses L3, L4 are a cemented lens. Thus, it is comprised of 5 groups and 6 lenses.

Further, the lenses are integrally moved as a first lens group G1 with a positive refractive power and a second lens group G2 with a negative refractive power arranged in this order from the object side. Each of the first and second lens groups G1, G2 is supported in a frame and the first lens group G1 is moved along the optical axis for focusing. A largest air space DA is variably provided between the first and second lens groups G1, G2 as in the first embodiment.

The first lens group G1 is comprised of the first to fifth lenses L1 to L5. The first lens L1 is a negative lens with two concave surfaces, a larger concave surface on the object side. The second lens L2 is a positive lens with two convex surfaces, a larger convex on the object side. The third lens L3 is a negative lens with two concave surfaces, a larger concave on the object side. The fourth lens L4 is a positive lens with two convex surfaces, a larger convex on the image side. The fifth lens L5 is a positive meniscus lens with two convex surfaces, a larger aspheric convex on the image side.

The first lens group G1 includes the aperture diaphragm AP, a front lens group G1F and a rear lens group G1R placing the aperture diaphragm in-between. The front lens group G1F on the object side includes the first and second lenses L1 to L2 and the rear lens group G1R on the image side includes the third to fifth lenses L3 to L5. The second lens group G2 is the sixth lens L6 as a negative meniscus lens with a larger concave surface on the object side. A back glass BG is disposed behind the first and second lens groups G1, G2.

As in the first embodiment, in focusing on an object from a limited or close range to infinity, only the first lens group G1 is moved along the optical axis to protrude while the second lens group G2 is fixed.

In the fourth embodiment the total focal length f of the lens system is 26.10 mm, a half angle of view ω is 28.4 degrees, and F-number is 2.55. The following table 7 shows specific data on the optical property of the lenses.

TABLE 7

| SURFACE NUMBER | R | D | $N_d$ | $v_d$ | $P_{g.F}$ | GLASS NAME | NOTE | |
|---|---|---|---|---|---|---|---|---|
| 01* | −23.106 | 1.00 | 1.68893 | 31.16 | 0.6037 | HOYA M-FD80 | L1 | G1 |
| 02 | 38.954 | 0.10 | | | | | | |
| 03 | 19.400 | 2.49 | 1.88300 | 40.80 | 0.5654 | HOYA TAFD30 | L2 | |
| 04 | −25.409 | 0.80 | | | | | | |
| 05 | APERTURE | 4.02 | | | | | | |
| 06 | −10.106 | 0.80 | 1.69895 | 30.05 | 0.6028 | HOYA E-FD15 | L3 | |
| 07 | 40.833 | 3.15 | 1.83481 | 42.72 | 0.5653 | HOYA TAFD5F | L4 | |
| 08 | −14.427 | 0.10 | | | | | | |
| 09 | −30.482 | 2.00 | 1.74330 | 49.33 | 0.5527 | HOYA M-NBF1 | L5 | |
| 10* | −18.907 | VARIABLE(DA) | | | | | | |
| 11 | −13.992 | 1.20 | 1.58144 | 40.89 | 0.5767 | HOYA E-FL5 | L6 | G2 |
| 12 | −24.992 | 4.603 | | | | | | |
| 13 | ∞ | 1.30 | 1.51680 | 64.20 | | Filter | BG | |
| 14 | ∞ | | | | | | | |

In the table 7 the first surface R1 of the first lens L1 and tenth surface R10 of the fifth lens L5 are aspheric. The aspheric parameters or coefficients of the $1^{st}$ and $10^{th}$ surfaces in the known formula are as follows.

First Surface R1

$K=0.0$ $A_4=-5.18356 \times 10^{-5}$ $A_6=-7.05306 \times 10^{-8}$

Tenth Surface R10

$K=0.0$ $A_4=3.82341 \times 10^{-5}$ $A_6=2.11800 \times 10^{-7}$ $A_8=-1.03464 \times 10^{-09}$ $A_{10}=3.68428 \times 10^{-11}$ In the fourth embodiment the air space DA between the fifth lens L5 of the first lens group G1 and the sixth lens L6 of the second lens group G2 is variable. The following table 8 shows the values of the air space when an object distance is changed to infinity and −1/20 (about object distance 500 mm) due to a magnification change.

TABLE 8

| | INFINITE | −1/20 |
|---|---|---|
| DA | 14.760 | 15.771 |

Further, the values of the parameters in the first to eleventh conditions are as follows.

| | |
|---|---|
| $D_{1G-2G}/L=0.401$ | 1. |
| $f_{1G}/f=0.880$ | 2. |
| $(R_{2GF}+R_{2GR})/(R_{2GF}-R_{2GR})$-3.55 | 3. |
| $f_{1RGF}/f=1.12$ | 4. |
| $R_{1RGF}/D_{1FG-1RG}=-2.10$ | 5. |
| $L_{S-A}/L_{S-I}=0.310$ | 6. |
| $L/f=1.41$ | 7. |
| $Y'/f=0.544$ | 8. |
| $\tan(\theta P_{max})=0.568$ | 9. |
| $n_{dpa}=1.820$ | 10. |
| $v_{dpa}=44.3$ | 11. |

Thus, the imaging lens according to the fourth embodiment satisfies the first to eleventh conditions.

FIG. 13 shows the aberration curves of the imaging lens according to the fourth embodiment at d-line and g-line when focusing on an infinite object and FIG. 14 shows the same when focusing on a close-range object at a magnification of −1/20.

Fifth Embodiment

Figure 5:
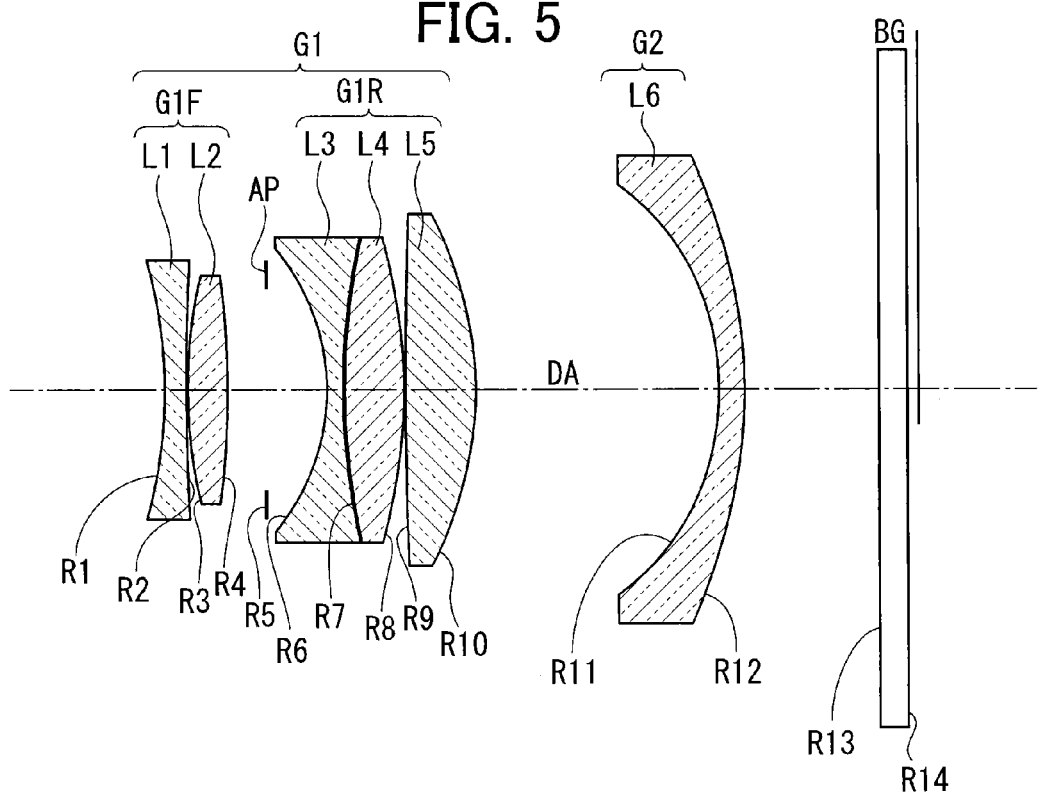
FIG. 5 is a cross section view of the optical system of an imaging lens according to a fifth embodiment of the present invention.

The imaging lens according to a fifth embodiment is described referring to FIG. 5. For the sake of simplicity, only a difference from the first embodiment is described. FIG. 5 cross-sectionally shows the configuration of the imaging lens in focusing at infinity. The imaging lens in FIG. 5 is comprised of first to second lenses L1 to L2, aperture diaphragm AP, third to sixth lenses L3 to L6 arranged in this order from the object side to the image plane. The third and fourth lenses L3, L4 are a cemented lens. Thus, it is comprised of 5 groups and 6 lenses.

Further, the lenses are integrally moved as a first lens group G1 with a positive refractive power and a second lens group G2 with a negative refractive power arranged in this order from the object side. Each of the first and second lens groups G1, G2 is supported in a frame and the first lens group G1 is moved along the optical axis for focusing. A largest air space DA is variably provided between the first and second lens groups G1, G2 as in the first embodiment.

The first lens group G1 is comprised of the first to fifth lenses L1 to L5. The first lens L1 is a negative lens with two concave surfaces, a larger concave on the object side. The second lens L2 is a positive lens with two convex surfaces, a larger convex on the object side. The third lens L3 is a negative lens with two concave surfaces, a larger concave on the object side. The fourth lens L4 is a positive lens with two convex surfaces at the same curvature. The fifth lens L5 is a positive lens with two convex surfaces, a larger convex on the image side.

Also, the first lens group G1 includes the aperture diaphragm AP, a front lens group G1F and a rear lens group G1R placing the aperture diaphragm in-between. The front lens group G1F on the object side includes the first and second lenses L1 to L2 and the rear lens group G1R on the image side includes the third to fifth lenses L3 to L5. The second lens group G2 is the sixth lens L6 as a negative meniscus lens with a larger concave surface on the object side. A back glass BG is disposed behind the first and second lens groups G1, G2 on the image side.

As in the first embodiment, in focusing on an object from a limited or close range to infinity, only the first lens group G1 is moved along the optical axis to protrude while the second lens group G2 is fixed.

In the fifth embodiment the total focal length f of the lens system is 22.91 mm, a half angle of view ω is 32.8 degrees, and F-number is 2.54. The following table 9 shows specific data on the optical property of the lenses.

In the fifth embodiment the air space DA between the fifth lens L5 of the first lens group G1 and the sixth lens L6 of the second lens group G2 is variable. The following table 10 shows the values of the air space when an object distance is changed to infinity and −1/20 (about object distance 500 mm) due to a magnification change.

TABLE 10

|    | INFINITE | −1/20  |
|----|----------|--------|
| DA | 11.150   | 11.948 |

Further, the values of the parameters in the first to eleventh conditions are as follows.

$D_{1G-2G}/L = 0.320$     1.

$f_{1G}/f = 0.835$     2.

$(R_{2GF}+R_{2GR})/(R_{2GF}-R_{2GR}) = -2.87$     3.

$f_{1FG}/f = 1.46$     4.

$R_{1RGF}/D_{1FG-1RG} = -2.17$     5.

$L_{S-A}/L_{S-I} = 0.322$     6.

$L/f = 1.52$     7.

$Y'/f = 0.620$     8.

$\tan(\theta P_{max}) = 0.550$     9.

$n_{dpa} = 1.873$     10.

$v_{dpa} = 40.6$     11.

TABLE 9

| SURFACE NUMBER | R | D | $N_d$ | $v_d$ | $P_{g.F}$ | GLASS NAME | NOTE | |
|---|---|---|---|---|---|---|---|---|
| 01 | −22.825 | 1.00 | 1.54814 | 45.79 | 0.5686 | OHARA S-TIL1 | L1 | G1 |
| 02 | 128.528 | 0.10 | | | | | | |
| 03 | 24.038 | 1.74 | 1.88300 | 40.76 | 0.5667 | OHARA S-LAH58 | L2 | |
| 04 | −42.601 | 1.80 | | | | | | |
| 05 | APERTURE | 2.80 | | | | | | |
| 06 | −9.970 | 0.80 | 1.80518 | 25.42 | 0.6161 | OHARA S-TIH6 | L3 | |
| 07 | 25.828 | 2.73 | 1.88300 | 40.76 | 0.5667 | OHARA S-LAH58 | L4 | |
| 08 | −25.828 | 0.10 | | | | | | |
| 09 | 188.729 | 3.29 | 1.85400 | 40.39 | 0.5677 | OHARA L-LAH85 | L5 | |
| 10* | −15.128 | VARIABLE(DA) | | | | | | |
| 11 | −11.423 | 1.20 | 1.48749 | 70.23 | 0.5300 | OHARA S-FSL5 | L6 | G2 |
| 12 | −23.668 | 6.305 | | | | | | |
| 13 | ∞ | 1.30 | 1.51680 | 64.20 | | Filter | BG | |
| 14 | ∞ | | | | | | | |

In the table 9 the tenth surface R10 of the fifth lens L5 is aspheric. The aspheric parameters or coefficients of the 10$^{th}$ surface in the known formula are as follows.
Tenth Surface R10

$K = 0.0$ $A_4 = 4.74266 \times 10^{-5}$ $A_6 = 3.92946 \times 10^{-8}$ $A_8 = 7.09415 \times 10^{-10}$ $A_{10} = 0.0$ Thus, the imaging lens according to the fifth embodiment satisfies the first to eleventh conditions.

FIG. 15 shows the aberration curves of the imaging lens according to the third embodiment at d-line and g-line when focusing on an infinite object and FIG. 16 shows the same when focusing on a close-range object at a magnification of −1/20.

Sixth Embodiment

Figure 6:
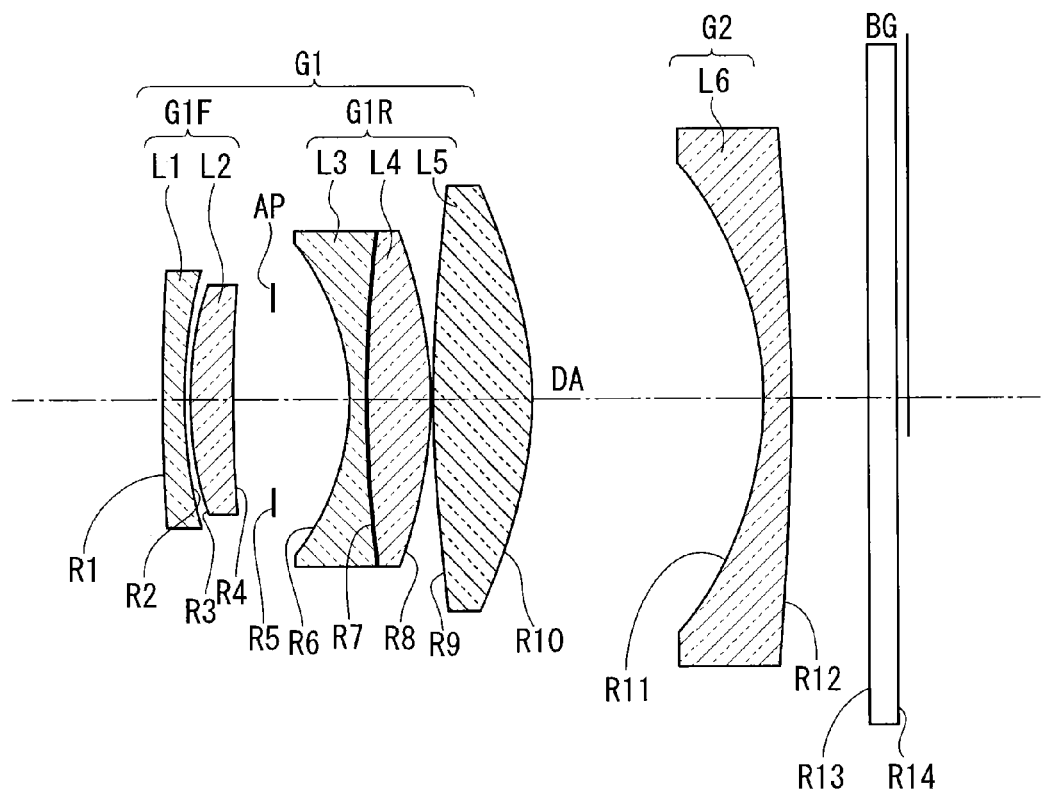
FIG. 6 is a cross section view of the optical system of an imaging lens according to a sixth embodiment of the present invention.

The imaging lens according to a fifth embodiment is described referring to FIG. 6. For the sake of simplicity, only a difference from the first embodiment is described. FIG. 6 cross-sectionally shows the configuration of the imaging lens in focusing at infinity. The imaging lens in FIG. 6 is comprised of first to second lenses L1 to L2, aperture diaphragm AP, third to sixth lenses L3 to L6 arranged in this order from the object side to the image plane. The third and fourth lenses L3, L4 are a cemented lens. Thus, it is comprised of 5 groups and 6 lenses.

Further, the lenses are integrally moved as a first lens group G1 with a positive refractive power and a second lens group G2 with a negative refractive power arranged in this order from the object side. Each of the first and second lens groups G1, G2 is supported in a frame and the first lens group G1 is moved along the optical axis for focusing. A largest air space DA is variably provided between the first and second lens groups G1, G2 as in the first embodiment.

The first lens group G1 is comprised of the first to fifth lenses L1 to L5. The first lens L1 is a negative meniscus lens with a large concave surface on the image side. The second lens L2 is a positive meniscus lens with a large convex surface on the object side. The third lens L3 is a negative lens with two concave surfaces, a larger concave on the object side. The fourth lens L4 is a positive lens with two convex surfaces, a larger convex on the image side. The fifth lens L5 is a positive lens with two convex surfaces, a larger convex on the image side.

Also, the first lens group G1 includes the aperture diaphragm AP, a front lens group G1F and a rear lens group G1R placing the aperture diaphragm in-between. The front lens group G1F on the object side includes the first and second lenses L1 to L2 and the rear lens group G1R on the image side includes the third to fifth lenses L3 to L5. The second lens group G2 is the sixth lens L6 as a negative meniscus lens with a larger concave surface on the object side. A back glass BG is disposed behind the first and second lens groups G1, G2 on the image side.

As in the first embodiment, in focusing on an object from a limited or close range to infinity, only the first lens group G1 is moved along the optical axis to protrude while the second lens group G2 is fixed.

In the sixth embodiment the total focal length f of the lens system is 20.50 mm, a half angle of view ω is 34.9 degrees, and F-number is 2.54. The following table 11 shows specific data on the optical property of the lenses.

$A_6 = 9.58020 \times 10^{-8}$ $A_8 = 5.83238 \times 10^{-12}$ $A_{10} = 0.0$

In the sixth embodiment the air space DA between the fifth lens L5 of the first lens group G1 and the sixth lens L6 of the second lens group G2 is variable. The following table 12 shows the values of the air space when an object distance is changed to infinity and −1/20 (about object distance 500 mm) due to a magnification change.

TABLE 12

|  | INFINITE | −1/20 |
|---|---|---|
| DA | 10.280 | 11.013 |

Further, the values of the parameters in the first to eleventh conditions are as follows.

$D_{1G-2G}/L = 0.309$   1.

$f_{1G}/f = 0.846$   2.

$(R_{2G} + R_{2GR})/(R_{2GF} - R_{2GR}) = -1.26$   3.

$f_{1FG}/f = 1.82$   4.

$R_{1RGF}/D_{1FG-1RG} = -1.89$   5.

$L_{S-A}/L_{S-I} = 0.407$   6.

$L/f = 1.62$   7.

$Y'/f = 0.673$   8.

$\tan(\theta P_{max}) = 0.652$   9.

$n_{dpa} = 1.872$   10.

$\nu_{dpa} = 40.6$   11.

Thus, the imaging lens according to the sixth embodiment satisfies the first to eleventh conditions.

TABLE 11

| SURFACE NUMBER | R | D | $N_d$ | $\nu_d$ | $P_{g,F}$ | GLASS NAME | NOTE | |
|---|---|---|---|---|---|---|---|---|
| 01 | 68.640 | 1.00 | 1.57501 | 41.50 | 0.5767 | OHARA S-TIL27 | L1 | G1 |
| 02 | 22.365 | 0.20 | | | | | | |
| 03 | 15.361 | 1.95 | 1.88300 | 40.80 | 0.5654 | HOYA TAFD30 | L2 | |
| 04 | 63.122 | 1.80 | | | | | | |
| 05 | APERTURE | 3.41 | | | | | | |
| 06 | −9.854 | 0.80 | 1.84666 | 23.78 | 0.6191 | HOYA FDS90 | L3 | |
| 07 | 43.974 | 2.83 | 1.88300 | 40.80 | 0.5654 | HOYA TAFD30 | L4 | |
| 08 | −18.330 | 0.10 | | | | | | |
| 09 | 57.841 | 4.36 | 1.85135 | 40.10 | 0.5694 | HOYA M-TAFD305 | L5 | |
| 10* | −16.854 | VARIABLE(DA) | | | | | | |
| 11 | −15.190 | 1.20 | 1.54814 | 45.79 | 0.5686 | OHARA S-TIL1 | L6 | G2 |
| 12 | −131.769 | 3.499 | | | | | | |
| 13 | ∞ | 1.30 | 1.51680 | 64.20 | | Filter | BG | |
| 14 | ∞ | | | | | | | |

In the table 11 the tenth surface R10 of the fifth lens L5 is aspheric. The aspheric parameters or coefficients of the 10$^{th}$ surface R10 in the known formula are as follows.

$K = 0.0$ $A_4 = 5.74685 \times 10^{-5}$

FIG. 17 shows the aberration curves of the imaging lens according to the third embodiment at d-line and g-line when focusing on an infinite object and FIG. 18 shows the same when focusing on a close-range object at a magnification of −1/20.

Seventh Embodiment

Figure 19A:
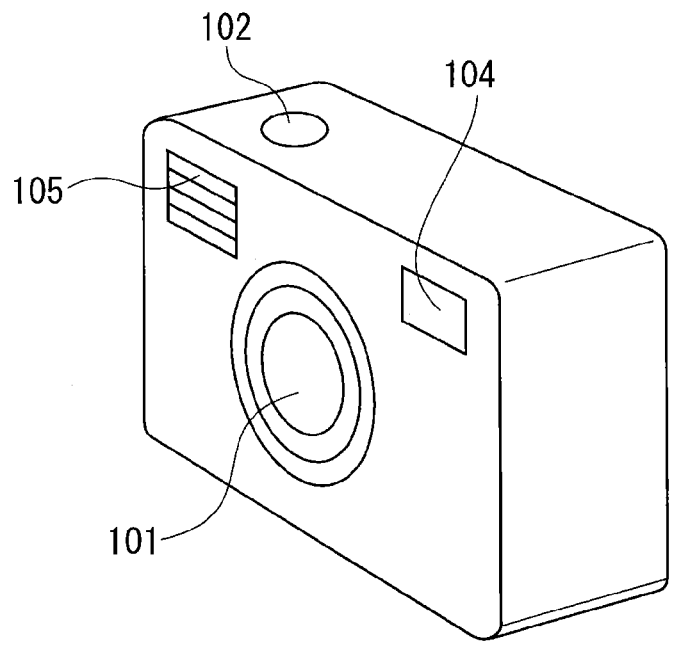
FIG. 19A is a perspective view of a digital camera as an example of imaging device according to a seventh embodiment when the imaging lens according to one of the first to sixth embodiments is collapsed into a camera body.
Figure 19B:
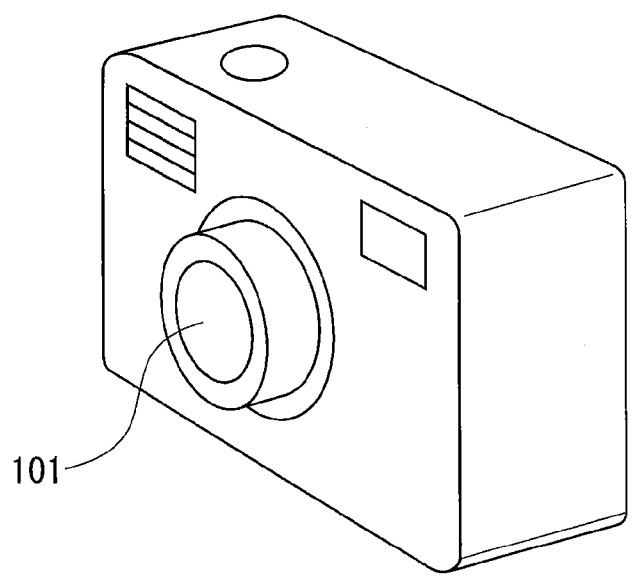
FIG. 19B is a perspective view of the same when the imaging lens is partially protruded.
Figure 20:
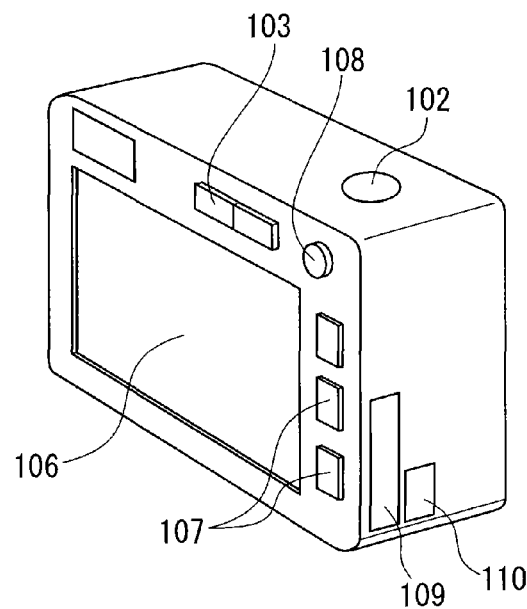
FIG. 20 is a perspective view of the rear side of the digital camera in FIG. 19A.
Figure 21:
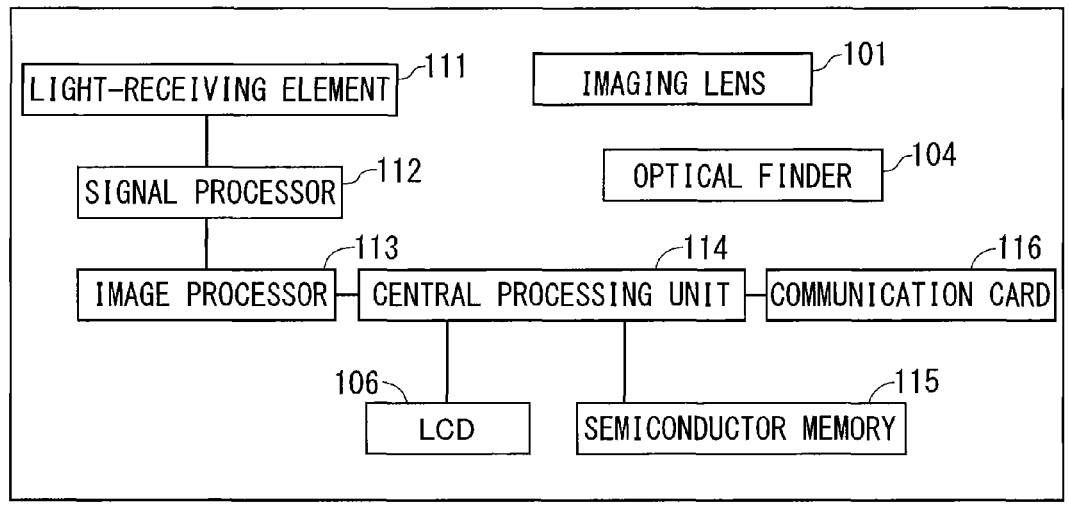
FIG. 21 is a block diagram of the functions of the digital camera in FIGS. 19A, 19B, and 20.

Next, an imaging device as a digital camera including the imaging lens according to one of the above embodiments is described, referring to FIGS. 19A to 21. FIG. 19A is a perspective view of the exterior of the digital camera seen from the object side when the imaging lens is collapsed into a camera body, and FIG. 19B is a perspective view of the same when the imaging lens is partially protruded. FIG. 20 is a perspective view of the rear side of the digital camera. FIG. 21 is a block diagram of the functions of the digital camera. The present embodiment exemplifies a digital camera, however, the imaging lens is applicable to a hand-held data terminal device such as a portable phone, PDA (personal data assistant) and a data terminal such as a smart phone in addition to a video camera or a film camera.

The digital camera in FIGS. 19A, 19B, 20 comprises an imaging lens 101, a shutter button 102, a digital zoom button 103, a viewfinder 10, a stroboscopic portion 105, a liquid crystal display 106, an operation button 107, a power switch 108, a memory card throttle 109, and a communication card throttle 110. Further, it comprises a light emitting element 111, a signal processor 112, an image processor 113, a CPU 117, a semiconductor memory 115 and a communication card 116.

In this digital camera the imaging lens 101 forms an optical image of a subject and the light receiving element 111 as an area sensor reads the optical image.

The output of the light receiving element 111 is processed by the signal processor 112 under the control of the CPU 114 and converted into digital image data. The digital image data is subjected to predetermined image processing by the image processor 113 under the control of the CPU 114 and stored in the semiconductor memory 115 as a non-volatile memory. The semiconductor memory 115 can be a memory card mounted in the throttle 109 or a semiconductor memory incorporated in a camera body. The LCD 106 can display captured images and stored images in the memory 115. The stored images can be transmitted to outside from the memory 115 via the communication card 116 mounted in the throttle 110.

The imaging lens 101 is collapsed into the camera body during non-use as shown in FIG. 19A. At power-on with the power switch 108 it is protruded from the camera body as shown in FIG. 19B. By a manipulation of the zoom button 103, the imaging lens can change a cutoff area of a subject image for zooming. Preferably, the optical system of the viewfinder 104 varies in magnification along with a change in the effective angle of view.

Upon a half press to the shutter button 102, the first lens group G1 alone is moved for focusing. Upon a full press, a subject image is captured. By a manipulation of the operation button 107, the stored images in the memory 115 are displayed on the LCD 106 or transmitted to outside via the communication card 110. The memory 115 and communication card 116 are mounted in general-purpose or dedicated throttles as the throttles 109, 110.

While the imaging lens 101 is in a collapsed state, the lens groups thereof do not need to be aligned on the optical axis. For example, the second lens group G2 can be moved away from the optical axis to be contained in parallel to the first lens group G1. This can achieve a further thinned digital camera.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An imaging lens comprising:
a first lens group having a positive refractive power on an object side and including at least three positive lenses and at least two negative lenses; and
a second lens group having a negative refractive power on an image side and consisting of a negative lens, the first and second lens groups arranged in this order from the object side with a widest air space in-between, wherein
in focusing an object from infinity to a close range, only the first lens group is moved to the object side and the second lens group is fixed relative to an image plane.

2. An imaging lens according to claim 1, wherein
the first and second lens groups are arranged to satisfy the following condition:

$$0.20 < D_{1G\text{-}2G}/L < 0.50$$

where $D_{1G\text{-}2G}$ is a distance from a lens surface of the first lens group closest to the image side to a lens surface of the second lens group closest to the object side when focusing on the infinite object, and L is a distance from a lens surface of the first lens group closest to the object side to the image plane when focusing on the infinite object.

3. An imaging lens comprising:
a first lens group having a positive refractive power on an object side and including at least three positive lenses and at least two negative lenses; and
a second lens group having a negative refractive power on an image side and having a negative lens, the first and second lens groups arranged in this order from the object side with a widest air space in-between, wherein
in focusing an object from infinity to a close range, only the first lens group is moved to the object side and the second lens group is fixed relative to an image plane, and
the first and second lens groups are arranged to satisfy the following conditions:

$$0.20 < D_{1G\text{-}2G}/L < 0.50$$

$$0.75 < f_{1G}/f < 0.95$$

where $D_{1G\text{-}2G}$ is a distance from a lens surface of the first lens group closest to the image side to a lens surface of the second lens group closest to the object side when focusing on the infinite object, L is a distance from a lens surface of the first lens group closest to the object side to the image plane when focusing on the infinite object, $f_{1G}$ is a focal length of the first lens group, and f is a focal length of the entire lens system.

4. An imaging lens according to claim 1, wherein
the second lens group is configured to satisfy the following condition:

$$-6.5 < (R_{2GF} + R_{2GR})/(R_{2GF} - R_{2GR}) < -1.0$$

where $R_{2GF}$ is a curvature radius of an object-side surface of the negative lens, and $R_{2GR}$ is a curvature radius of an image side surface of the negative lens.

5. An imaging lens comprising:
a first lens group having a positive refractive power on an object side and including at least three positive lenses and at least two negative lenses; and
a second lens group having a negative refractive power on an image side and having a negative lens, the first and second lens groups arranged in this order from the object side with a widest air space in-between, wherein in focusing an object from infinity to a close range, only the first lens group is moved to the object side and the second lens group is fixed relative to an image plane, the first lens group comprises an aperture diaphragm, a front lens group arranged closer to the object side than the aperture diaphragm, and a rear lens group arranged closer to the image side than the aperture diaphragm, and the first lens group is configured to satisfy the following condition:

$$1.0 < f_{G1F}/f < 2.0$$

where $f_{G1F}$ is a focal length of the front lens group and f is a focal length of the entire lens system.

6. An imaging lens according to claim 5, wherein:

the rear lens group includes a negative lens closest to the object side and having a concave surface on the object side; and the rear lens group is configured to satisfy the following condition:

$$-2.5 < R_{1RGF}/D_{1FG-1RG} < -1.0$$

where $R_{1RGF}$ is a curvature radius of the concave surface of the negative lens and $D_{1FG-1RG}$ is a distance from a lens surface of the front lens group closest to the image to a lens surface of the rear lens group closest to the object side.

7. An imaging lens according to claim 5, wherein:

the rear lens group includes an aspheric surface shaped such that closer to a periphery a portion is, a positive refractive power of the portion becomes smaller;

the rear lens group is configured to satisfy the following condition:

$$0.25 < L_{S-A}/L_{S-I} < 0.55$$

where $L_{S-A}$ is a distance from the aperture diaphragm to the aspheric surface and $L_{S-I}$ is a distance from the aperture diaphragm to the image plane.

8. An imaging lens according to claim 5, wherein the rear lens group comprises, from the object side, a negative lens with a concave surface on the object side, a positive lens with a convex surface on the image side, and a positive lens with a convex surface on the image side.

9. An imaging lens comprising:

a first lens group having a positive refractive power on an object side and including at least three positive lenses and at least two negative lenses; and a second lens group having a negative refractive power on an image side and having a negative lens, the first and second lens groups arranged in this order from the object side with a widest air space in-between, wherein in focusing an object from infinity to a close range, only the first lens group is moved to the object side and the second lens group is fixed relative to an image plane, and the imaging lens is configured to satisfy the following condition:

$$1.2 < L/f < 2.0$$

where in focusing on the infinite object, L is a distance from a lens surface closest to the object side to the image plane and f is a focal length of the entire lens system.

10. An imaging lens comprising:

a first lens group having a positive refractive power on an object side and including at least three positive lenses and at least two negative lenses; and a second lens group having a negative refractive power on an image side and having a negative lens, the first and second lens groups arranged in this order from the object side with a widest air space in-between, wherein in focusing an object from infinity to a close range, only the first lens group is moved to the object side and the second lens group is fixed relative to an image plane, and the imaging lens is configured to satisfy the following conditions:

$$0.50 < Y'/f < 0.75$$

$$0.50 < \tan(\theta P_{max}) < 0.70$$

where Y' is a maximal image height, $\theta P_{max}$ is an incidence angle of a principal beam reaching the maximal image height on the image plane, and f is a focal length of the entire lens system in focusing on the infinite object.

11. A camera comprising the imaging lens according to claim 1 as a photographic optical system.

12. A hand-held data terminal device comprising a camera function and the imaging lens according to claim 1 as a photographic optical system.

* * * * *